US007392068B2

(12) United States Patent
Dayan et al.

(10) Patent No.: US 7,392,068 B2
(45) Date of Patent: *Jun. 24, 2008

(54) ALTERNATIVE WIREFREE MOBILE DEVICE POWER SUPPLY METHOD AND SYSTEM WITH FREE POSITIONING

(75) Inventors: Tal Dayan, Los Gatos, CA (US); Ofer Goren, Palo Alto, CA (US); Dan Kikinis, Saratoga, CA (US); William Ward Maggs, Mission, TX (US)

(73) Assignee: Mobilewise

( * ) Notice: Subject to any disclaimer, the term of this patent is extended or adjusted under 35 U.S.C. 154(b) by 489 days.

This patent is subject to a terminal disclaimer.

(21) Appl. No.: 10/211,224

(22) Filed: Aug. 1, 2002

(65) Prior Publication Data

US 2004/0082369 A1 Apr. 29, 2004

Related U.S. Application Data

(60) Provisional application No. 60/366,101, filed on Mar. 19, 2002, provisional application No. 60/365,591, filed on Mar. 18, 2002, provisional application No. 60/361,631, filed on Mar. 1, 2002, provisional application No. 60/361,626, filed on Mar. 1, 2002, provisional application No. 60/361,602, filed on Mar. 1, 2002.

(51) Int. Cl.
*H04B 1/38* (2006.01)
*H04M 1/00* (2006.01)

(52) U.S. Cl. .................... 455/572; 455/573; 455/127.1; 455/127.5; 455/574; 455/343.5; 455/343.6; 439/188; 439/913; 439/246

(58) Field of Classification Search ................. 455/572, 455/573, 574, 127.1, 127.5, 343.5, 343.6; 439/246, 504, 488, 315, 911, 919, 913, 950, 439/188; 342/36, 357.1; 370/342
See application file for complete search history.

(56) References Cited

U.S. PATENT DOCUMENTS

| | | | | |
|---|---|---|---|---|
| 4,654,573 | A | 3/1987 | Rough et al. | |
| 5,371,456 | A * | 12/1994 | Brainard | 320/161 |
| 5,410,141 | A * | 4/1995 | Koenck et al. | 235/472.02 |

(Continued)

FOREIGN PATENT DOCUMENTS

DE 26 40 717 A 3/1978

(Continued)

OTHER PUBLICATIONS

PCT Notification of Transmittal of The International Search Report or The Declaration for PCT Counterpart Application No. PCT/US03/06179 Containing International Search Report (Jul. 10, 2003).

(Continued)

*Primary Examiner*—Marceau Milord
(74) *Attorney, Agent, or Firm*—Holland & Knight LLP; John P. Moran

(57) ABSTRACT

The invention provides a power delivery system for a mobile device. The power delivery system includes a contactor device and a plurality of first electrical contacts on the contactor device disposed in an interspersed arrangement wherein first electrical contacts of one polarity are interspersed with first electrical contacts of a second polarity throughout the contactor body.

15 Claims, 18 Drawing Sheets

U.S. PATENT DOCUMENTS

| | | | | |
|---|---|---|---|---|
| 5,535,274 | A | 7/1996 | Braitberg et al. | |
| 5,600,225 | A | 2/1997 | Goto | |
| 5,696,367 | A * | 12/1997 | Keith | 235/381 |
| 5,732,074 | A | 3/1998 | Spaur et al. | |
| 5,821,731 | A | 10/1998 | Kuki et al. | |
| 5,898,933 | A * | 4/1999 | Kaschke | 455/575.7 |
| 5,923,544 | A | 7/1999 | Urano | |
| 5,929,598 | A | 7/1999 | Nakama et al. | |
| 5,936,380 | A * | 8/1999 | Parrish | 320/101 |
| 5,952,814 | A | 9/1999 | Van Lerberghe | |
| 5,953,677 | A * | 9/1999 | Sato | 455/574 |
| 5,955,867 | A * | 9/1999 | Cummings et al. | 320/107 |
| 5,959,433 | A | 9/1999 | Rohde | |
| 5,963,012 | A | 10/1999 | Garcia et al. | |
| 6,008,622 | A | 12/1999 | Nakawatase | |
| 6,016,046 | A | 1/2000 | Kaite et al. | |
| 6,023,147 | A * | 2/2000 | Cargin et al. | 320/114 |
| 6,028,413 | A | 2/2000 | Brockmann | |
| 6,040,680 | A | 3/2000 | Toya et al. | |
| 6,057,668 | A * | 5/2000 | Chao | 320/108 |
| 6,073,033 | A * | 6/2000 | Campo | 455/566 |
| 6,075,345 | A * | 6/2000 | Lee | 320/138 |
| 6,118,249 | A | 9/2000 | Brockmann et al. | |
| 6,122,514 | A | 9/2000 | Spaur et al. | |
| 6,163,705 | A * | 12/2000 | Miya | 455/522 |
| 6,216,013 | B1 * | 4/2001 | Moore et al. | 455/557 |
| 6,275,143 | B1 | 8/2001 | Stobbe | |
| 6,278,884 | B1 * | 8/2001 | Kim | 455/556.1 |
| 6,316,909 | B1 | 11/2001 | Honda et al. | |
| 6,326,884 | B1 | 12/2001 | Wohlrabe | |
| 6,339,711 | B1 * | 1/2002 | Otaka et al. | 455/550.1 |
| 6,341,218 | B1 | 1/2002 | Poplawsky et al. | |
| 6,345,180 | B1 * | 2/2002 | Reichelt | 455/404.1 |
| 6,377,825 | B1 | 4/2002 | Kennedy et al. | |
| 6,430,164 | B1 | 8/2002 | Jones et al. | |
| 6,459,175 | B1 * | 10/2002 | Potega | 307/149 |
| 6,509,717 | B2 * | 1/2003 | Lee | 320/116 |
| 6,529,743 | B1 * | 3/2003 | Thompson et al. | 455/557 |
| 6,594,471 | B1 | 7/2003 | Crowley et al. | |
| 6,633,769 | B2 * | 10/2003 | Shoobridge | 455/574 |
| 6,731,952 | B2 * | 5/2004 | Schaeffer et al. | 455/557 |
| 6,913,477 | B2 * | 7/2005 | Dayan et al. | 439/188 |
| 2002/0061739 | A1 * | 5/2002 | Nakamura et al. | 455/343 |
| 2002/0089305 | A1 | 7/2002 | Park et al. | |
| 2002/0093309 | A1 | 7/2002 | Peele | |
| 2003/0009308 | A1 | 1/2003 | Kirtley | |
| 2004/0048511 | A1 | 3/2004 | Dayan et al. | |

FOREIGN PATENT DOCUMENTS

| | | | |
|---|---|---|---|
| DE | 40 11 198 | A | 10/1991 |
| FR | 2 271 952 | A | 12/1975 |
| FR | 2 613 883 | A | 10/1988 |
| WO | 93 15929 | A | 8/1993 |

OTHER PUBLICATIONS

PCT Notification of Transmittal of The International Search Report or The Declaration for PCT Counterpart Application No. PCT/US03/06166 Containing International Search Report (Jul. 10, 2003).

PCT Notification of Transmittal of International Preliminary Examination Report for PCT Counterpart Application No. PCT/US03/06166 dated Apr. 30,2004, 5 pgs.

* cited by examiner

ALTERNATIVE WIREFREE MOBILE DEVICE POWER SUPPLY METHOD AND SYSTEM WITH FREE POSITIONING

CLAIM OF PRIORITY

This application hereby claims the benefit of provisional Application No. 60/361,631 filed on Mar. 1, 2002, titled Conductive Coupler With Three Degrees of Freedom, provisional Application No. 60/361,626, filed on Mar. 1, 2002, titled Automatic and Adaptive Power Supply, provisional Application No. 60/361,602 filed on Mar. 1, 2002 titled Wireless Adaptive Power Provisioning System for Small Devices, Application No. 60/365,591 filed on Mar. 18, 2002 titled Enhanced Wireless Adaptive Power Provisioning System for Small devices and provisional Application No. 60/366,101 which was filed Mar. 19, 2002 and titled Enhanced Wireless Adaptive Power Provisioning System for Small Devices, each of which are hereby incorporated by reference.

FIELD OF THE INVENTION

This invention relates to mobile devices. In particular it relates to the connection or coupling arrangements for mobile devices whereby power or network connectivity is provided to the mobile devices.

BACKGROUND

Mobile devices such as notebook computers, personal digital assistants, mobile telephones, pagers etc. require periodic recharging, which generally involves connecting the mobile device to a charging unit which draws power from a wall socket.

Generally, electrical interconnection between the mobile device and the charging unit is achieved by a pin arrangement, which requires accurate alignment of electrical contact pins before charging can take place. Thus, the mobile device has to be held in a fixed spatial relationship to the charging device while charging takes place. This restricts the mobility, and thus the utility of the mobile device while charging takes place.

DETAILED DESCRIPTION

In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in this specification to "one case" or "a case" means that a particular feature, structure, or characteristic described in connection with the case is included in at least one case of the invention. The appearances of the phrase "in one case" in various places in the specification are not necessarily all referring to the same case, nor are separate or alternative cases mutually exclusive of other cases. Moreover, various features are described which may be exhibited by some cases and not by others. Similarly, various requirements are described which may be requirements for some cases but not other cases.

In one case, the invention provides an electrical coupling system ("CS") that allows the closing of an electrical circuit between two bodies, each with a surface that contains a conductive area. The CS provides three degrees of freedom between the two surfaces. The first degree comprises a linear movement along an X axis of an XY plane that is essentially co-planar to the larger of the bodies. The third degree comprises a rotation around a Z axis that is perpendicular to the XY plane In some cases, free positioning contacts may include telescopic action in the Z axis direction (not shown).

Figure 1:
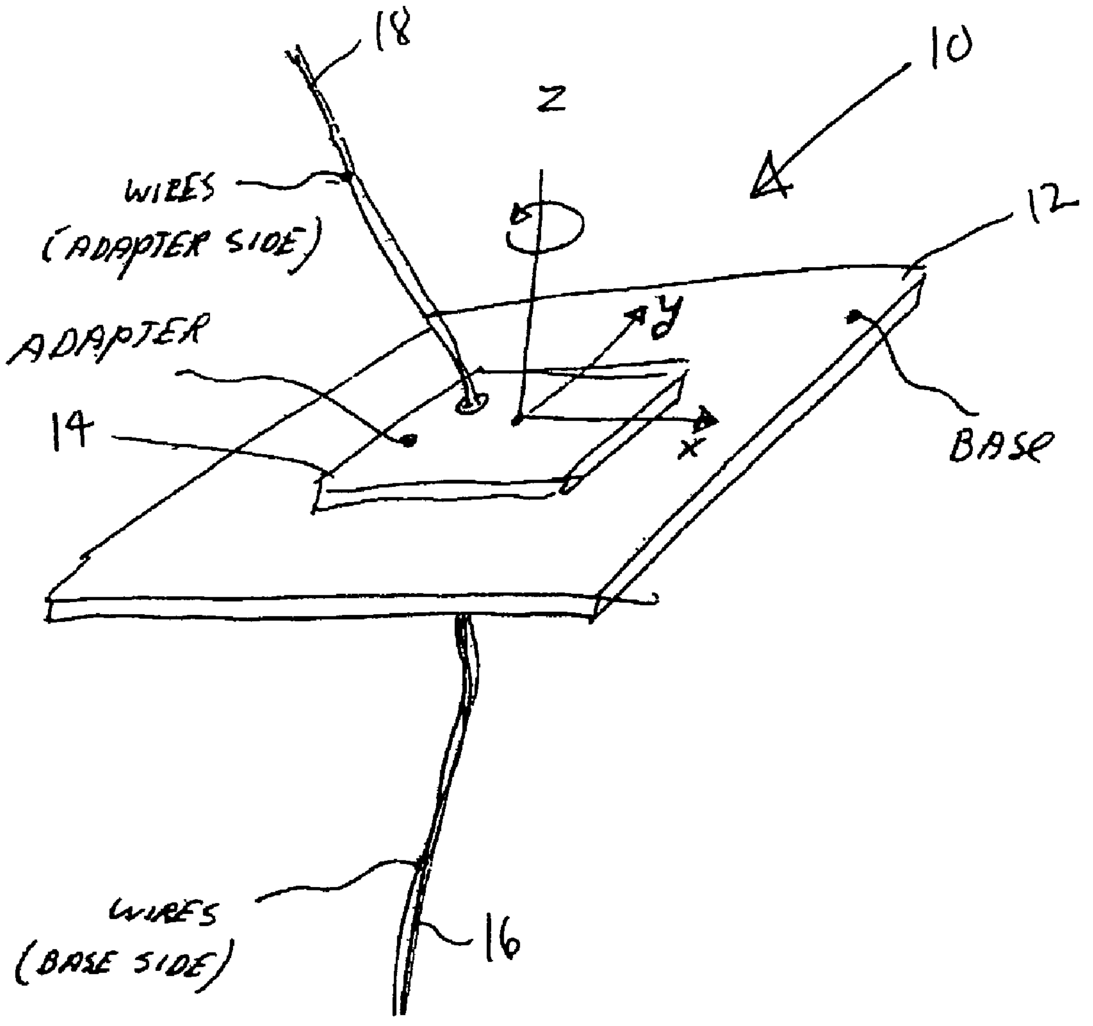
FIG. 1 shows a perspective view of a coupling system in accordance with the invention.

FIG. 1 shows a simplified perspective view of a coupling system 10 comprising conductive area 12 which forms part of a charging or base unit (not shown) which is typically stationary. The CS 10 also includes a second conductive area 14 which is part of an adapter unit (not shown). Also shown for orientation, is the above mentioned coordinate system comprising the x y plane and the Z axis perpendicular thereto. Electrical lead wires 16 and 18 electrically connect the conductive areas 12, 14, respectively to the base unit and the adaptor unit, respectively. The conductive areas 12, 14 may either be attached to the base unit and the adaptor unit, respectively, or, in a preferred case, integrated with the base unit and the adaptor unit, respectively. This allows a power circuit between the base unit and the adaptor unit to be closed, without requiring alignment, as is required by conventional connectors, power charging cradles, etc.

In one instance, the CS 10 may be used to provide power to notebook computers or other mobile devices by allowing the mobile devices to be placed freely on an energizing desktop or other surface which forms part of the base unit. In this instance, the desktop or other surface forms the conductive area 12 of the CS 10 and a bottom of the mobile device acts as the conductive area 14. A power supply is connected to the conductive area 12 of the desk or surface (such as a desk pad, writing pad, etc.) and can close an electrical circuit with the conductive area 14 of the mobile device placed thereupon, thus allowing e.g. a charging or power circuit of the mobile device to be energized independently of an XY, or angular position of the mobile device on the desk top or other surface.

When the conductive areas 12, 14 are brought into contact (typically the conductive area 14 is placed on top of the conductive area 12) the relative position can be expressed as a tuple of three numbers [X, Y, G] called "relative placement" or "placement" in short. The X and Y values denote the linear displacement between the centers of the conductive areas 12, 14 relative to the XY coordinate system. The G value denotes the relative radial angle in degrees between the conductive areas 12, 14, as projected onto the XY plane with some arbitrary relative rotation considered to have a rotation of zero degrees.

A placement is said to be "supported" or "active" if a closed electrical circuit can be formed between the base unit and the adaptor unit through electrical contacts on or adjacent conductive areas 12, 14, respectively. In one case, a set of active placements forms a continuous range without gaps. In other words, when the conductive area 14 rests on the conductive area 12, a placement is guaranteed to be active regardless of the relative position of the conductive area 14 and the conductive area 12.

Figure 2:
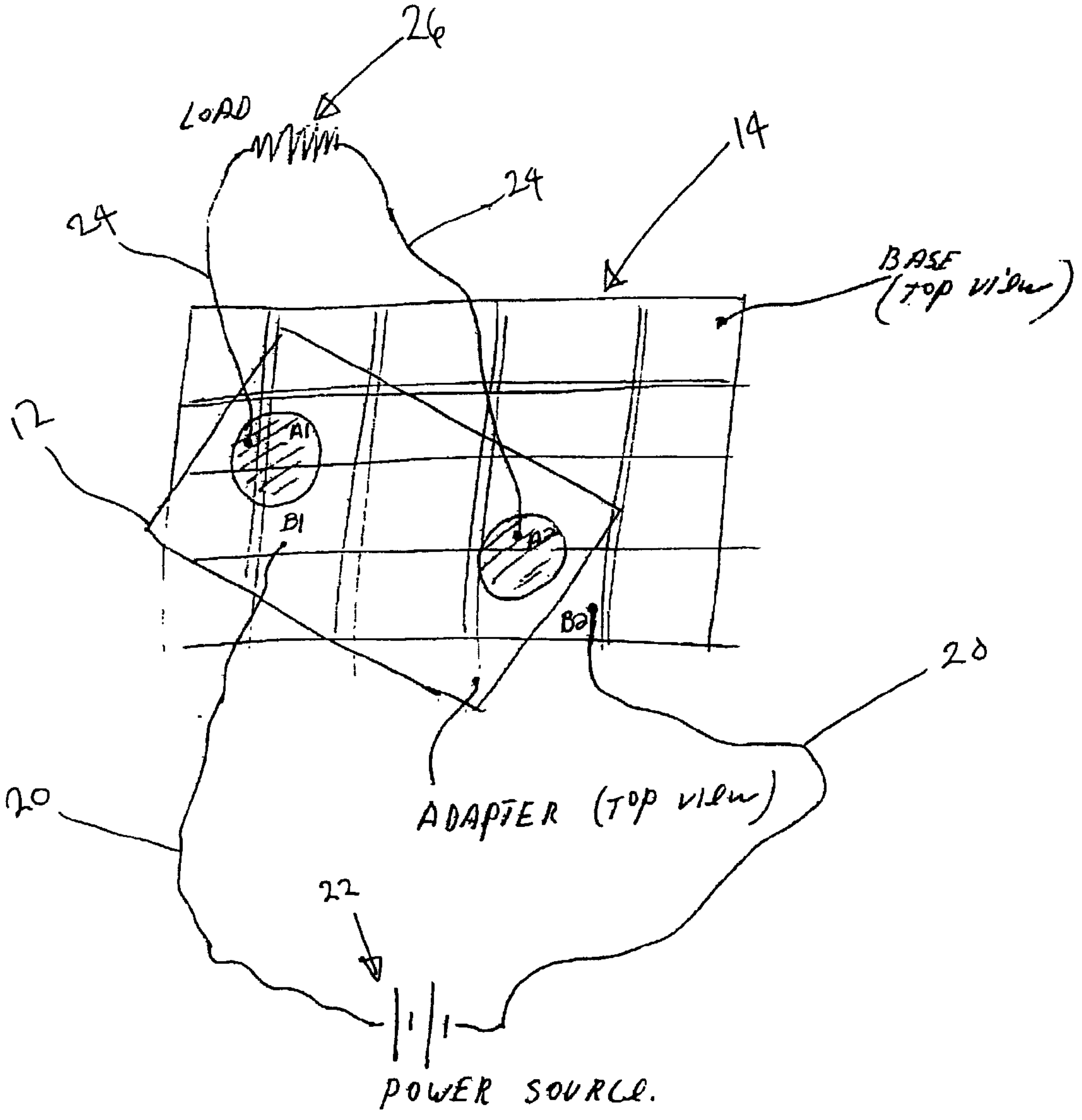
FIG. 2 shows a schematic drawing of an electrical connection between an adaptor unit and a base unit, in accordance with the invention.

FIG. 2 of the drawings shows a simplified view of an electrical connection between an adaptor unit and a base unit. As will be seen, the base unit comprises conductive area 14 which includes at least two electrical contacts B1 and B2 that are electrically connected via electrical lead wires 20 to a power source 22. The adaptor unit includes at least two electrical contacts A1 and A2 that are electrically connected via electrical lead wires 24 to a circuit of the mobile device, for example a power or charging circuit, which is depicted, in simplified form, as electrical load 26. A number, size, shape, dimension, spacing, and other spatial configuration aspects of the electrical contacts of the conductive surfaces 12 and 14 are such that for each placement that is in the active range, there is at least one pair of contacts B1 and B2 of the base unit, and at least one pair of contacts A1 and A2 of the adaptor unit that satisfy the following conditions:

(a) contactor B1 of the base unit touches A1 of the adaptor unit;

(b) contactor B2 of the base unit touches contactor A2 of the adaptor unit; and (c) the electrical contact of the base unit and the adaptor unit do not form a short circuit between electrical contacts B1 and B2.

When the above conditions are met when, a two wire electrical circuit can be formed between the base unit and the adaptor units using contacts A1-B1 as one lead and contact A1-B2 as the other lead. In some cases, where multi-phase power is required, for each placement more than two contacts (for example three contacts) of the base limit may make contact with corresponding contacts of the adaptor unit to enable multi-phase power transmission between the base unit and the adaptor unit.

The routing of current to the pairs of contacts for each active placement can be done in many ways. In some cases, a sensing circuit detects a signal that is asserted by the adaptor unit contacts when they come into contact with the base unit contacts. The sensing circuit uses this information to activate the base unit contacts that are touched by the adaptor unit contacts. In other cases, the current can be redirected to the contacts by sensing the relative position of the conductive surfaces 12 and 14. In other cases, the base unit can switch power to a sequence of pairs of base unit contacts until it senses that the circuit is closed with the mobile device. In other cases, the current routing can be done by mechanical switches that are activated by the conductive areas 12, 14 based on their relative positions.

Figure 3:
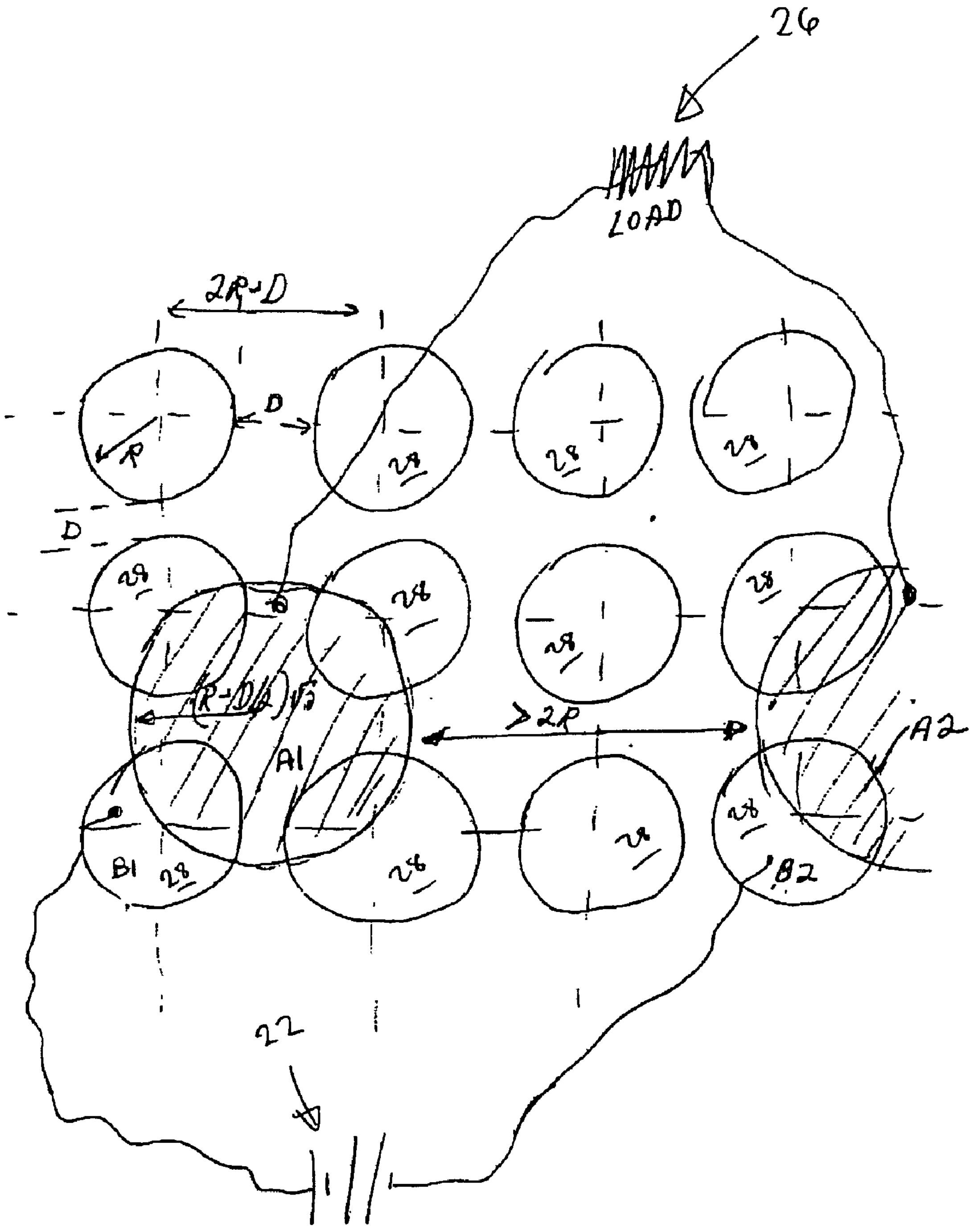
FIG. 3 shows an example of a coupling system implementation for a notebook computer.

FIG. 3 of the drawings shows an example of a CS implementation for a notebook computer. As described above, the adaptor unit includes an electrical load 26 that is electrically connected to two electrical contacts B1 and B2. The conductive area 12 of the base unit includes a plurality of circular electrical contacts 28 disposed in a rectangular array. Of these, electrical contacts 28, contacts marked A1 and A2 are active in a sense that they receive power from the power supply 22. It will be appreciated that the plurality of electrical contacts 28 allow for a wide range of movement in the X and Y directions and a 360° freedom of rotation around the Z axis for which placement of the electrical contacts is still active. The conductive area 12 of the base unit may be defined by a top surface of a desktop, whereas the conductive area 14 of the adaptor unit may be built into a notebook computer with the contacts A1 and A2 mounted on a bottom surface of the notebook computer. In some cases the contacts A1 and A2 may be built into the notebook computer itself. In other cases, the contacts A1 and A2 may be part of an adaptor pad with conductive areas 12. The adaptor pad may be attached to an underside of the notebook computer using an electrical wire lead that can be connected directly to a charging port of the notebook computer.

In the example shown in FIG. 3 of the drawings, the contacts 28 are arranged as an array of circles of radius R with a horizontal and vertical spacing D between adjacent circles. The adaptor contacts A1, A2 in this example, each comprises a circle of radius $(R+D/2)\times\sqrt{2}$ and with at least a spacing greater than 2R.

In the example of FIG. 3, when the notebook computer is placed on the desktop at any arbitrary position and angle, two base contacts B1 and B2 that satisfy the above three conditions can always be found. These two contacts, B1 and B2 can be used to close a circuit with a notebook computer through two notebook computer contacts A1, A2. It is to be appreciated that other spacing, contact sizes, and placements may be used. For example, rather than just having rows and columns, the base unit may comprise electrical contacts arranged in a honeycomb pattern with interleaving non-conductive areas. Alternatively, instead of having circular base contacts, the base contacts may be linear and be disposed in a linear array.

In FIG. 3, for ease of understanding, load 26 symbolizes the electrical aspects of the notebook computer and, the power source 22 indicates a power supply. It will be appreciated by one skilled in the art that the load 26 and the power source 22 may in reality be quite complex.

Figure 4A:
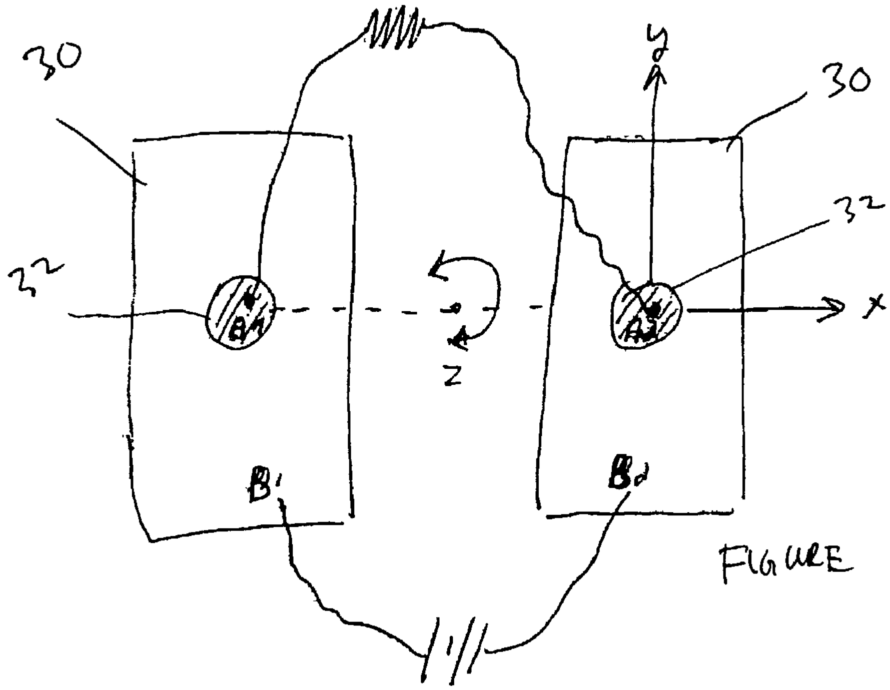
FIG. 4 shows a case of a coupling system which does not require dynamic power switching to contact.
Figure 4B:
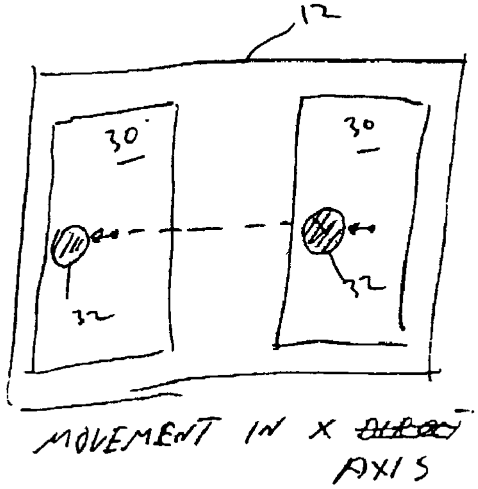
Figure 4C:
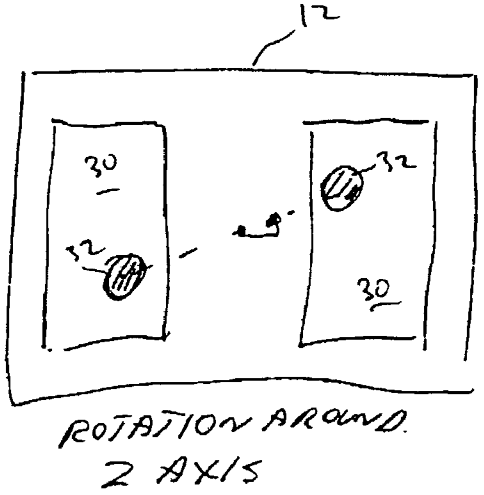

FIG. 4 shows a case of a CS which does not require dynamic power routing or switching to the base contacts. Referring to FIG. 4, it will be seen that the electrical contacts of the base (hereinafter referred to as the "base contacts") B1 and B2 are in the form of the form of two rectangular pads 30. As before, the electrical contacts of the adaptor unit A1 and A2 (hereinafter referred to as "adaptor contacts") are in the form of two circular contact pads 32. The arrangement shown in FIG. 3, allows limited linear movement along the X and Y axes and limited rotational movement about the Z axis. The example of FIG. 4 does not require dynamic power switching to the base contacts. Further, movement along the X and Y axes is limited in the sense that an adaptor contacts 32 must always make contact with a base contact 30. Thus, for example as can be seen in FIG. 4B of the drawings movement along the X axis can occur until the adaptor contacts 32 reach the left edge of the base contacts 30. Similarly, rotation around the Z axis is limited in the sense that the adaptor contacts 32 must always make contact with the base contacts 30. Thus, in example shown in FIG. 4C of the drawings, rotation along the Z axis is permitted as long as adaptor contacts 32 make contact with base contacts 30.

In order to control power application to a multi-contact coupling system, preferably in idle state, base contacts B1 and B2 are not energized. When a load is connected to the base contacts B1 and B2, a sensing unit in the base unit detects the load and switches power to the contacts B1 and B2 based on information and properties of the load. In one case, the power is of a predefined voltage and polarity, or frequency. In some cases, the sensing unit may sense various parameters such as operational status, identification, and power requirements from the load and perform authentication, authorization and compatibility checks before providing power to contacts B1 and B2 using the required voltage and polarity. In yet other cases, the base or charging unit may include a surface with a plurality of exposed contacts and may be configured to supply power to multiple loads, each connected to a further set of contacts and having different voltage characteristics. In some cases, the charging unit will provide protection against short circuits and overloads when contacts of the charging unit are connected, thus providing shock protection when exposed contacts of the charging unit are touched when an electrical load is not present.

Figure 5:
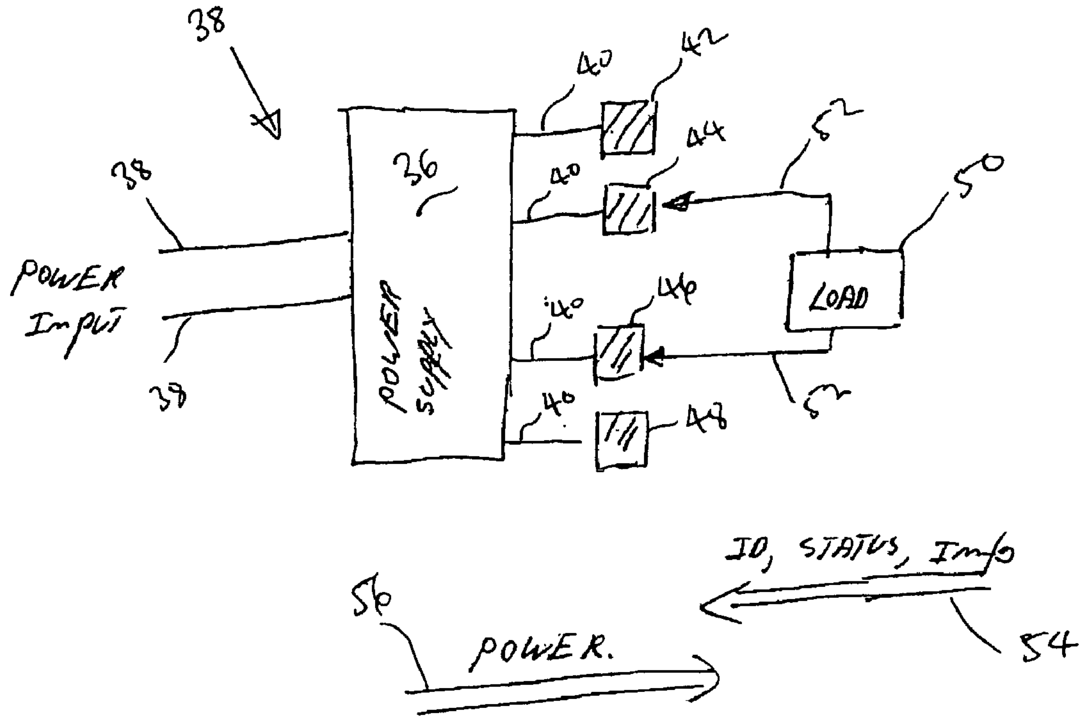
FIG. 5 shows a block diagram of a base or charging unit in accordance with the invention.

FIG. 5 of the drawings shows a block diagram of one case of a base or charging unit of the present invention. The charging unit includes a power supply 36 which is electrically connected via power input lines 38 to a power source and via power output lines 40 to electrical contacts 42 to 48. As can be seen, electrical load 50 which represents, for example electrical circuitry of a notebook computer, is electrically connected via electrical lead lines 52 to contacts 44 and 46.

The power supply 36 receives power from a standard household current supply, but in some cases may also use other sources, such as generators, solar panels, batteries, fuel cells, etc. each separately, or in any combination. In the current art, contacts of a power supply generally provide voltage in a preset voltage, frequency and polarity, independently of an actual load 50 attached to the power supply 36. In the present case, the power supply 36 detects when, where, and how electrical load 50 is connected to the power contacts 42-48 and may sense information such as identification, product type, manufacturer, polarity power requirements, and other parameters and properties of the load and the connection type required. The base unit uses this information to connect the power supply 36 to the electrical load 50. Thus, in accordance with aspects of the present invention, authentication and compatibility checks may be performed before providing power to an electrical load. Further a power supply may be adapted in terms of voltage, polarity and frequency to the needs of a specific electrical load, thus improving safety by avoiding exposed power connectors when no load is attached, and also providing the ability to power a plurality of electrical loads at the same time, each connected to an arbitrary set of contacts and receiving a different voltage. The exchange and negotiation of information between the electrical load 50 and the power supply 36 is symbolized by arrows 54 and 56 in FIG. 5 of the drawings. For example, arrow 54 indicates that identification and status information associated with load 50 is supplied to a sensing circuit (not shown) of power supply 36 which ensures that the correct voltage, polarity and frequency of power is supplied to electrical contacts 44 and 46.

Figure 6:
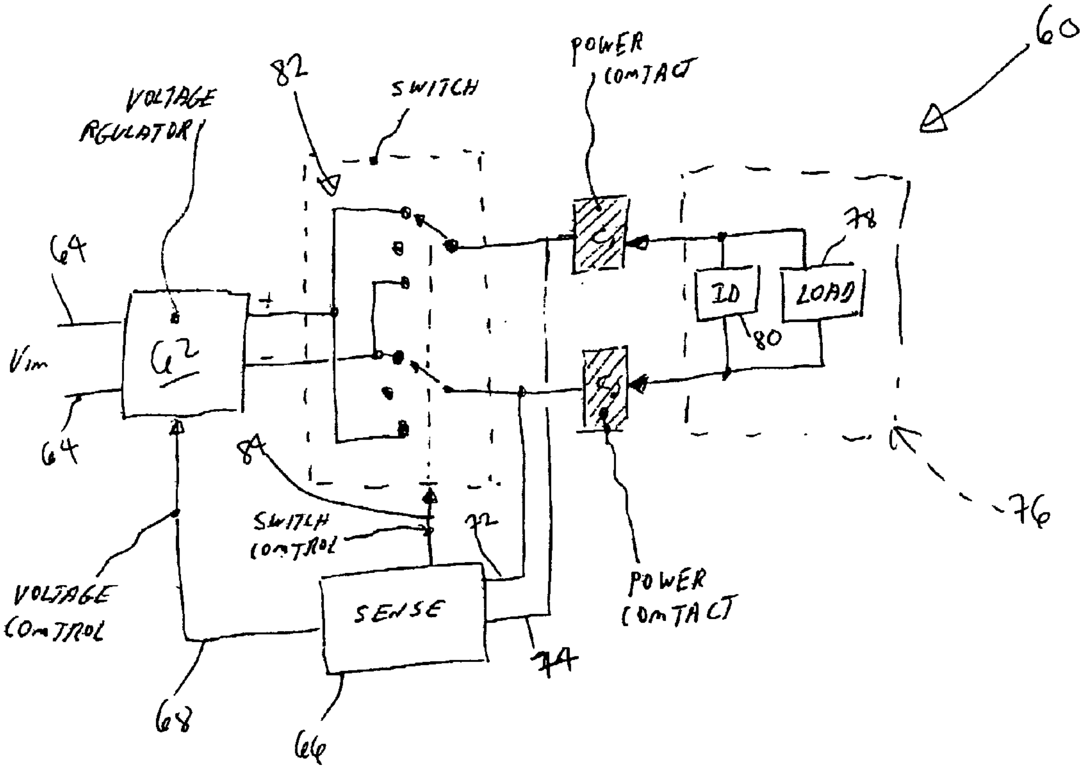
FIG. 6 shows a block diagram of a system for supplying power in accordance with the invention.

Referring now to FIG. 6 of the drawings, a block diagram of a particular instance 60 of a system for supplying power described above is shown. The system 60 may be used to deliver power to a multitude of power contacts, however, for purposes of simplicity, only two power contacts C1 and C2 are shown. Thus, it must be borne in mind that more contacts may be served by the power supply system 60.

The power supply system 60 includes a voltage regulator 62 connected via electrical lines 64 to a current supply which may be a household current supply or any of the other sources mentioned above. A sensing unit 66 is connected via a voltage control line 68 to the voltage regulator 62 and via sensing lines 72 and 74 to power contacts C1 and C2, respectively. The contacts C1 and C2 are electrically connected to a mobile device, for example, a notebook computer 76 which includes an electrical load 78 and an identification load 80. In use, the sensing unit 66 senses the identification load 80 and in particular information such as identification, product type, manufacturer, polarity power requirements and other parameters and properties associated with the electrical load 78. This information is used to control voltage regulator 62 to supply power in the correct voltage, polarity, frequency etc. to electrical load 78 via a switching arrangement 82. As mentioned above, the power supply arrangement 60 generally comprises more than just the power contacts C1 and C2 and thus, during a first stage, the sensing unit 66 scans for the presence of more than one electrical load 78 connected to the power contacts of the power supply 60. After scanning, the sensing unit 66 sends a switch control signal 84 to the switching arrangement 82 to open and close the necessary switches in order to supply power to only those power contacts that have electrical loads connected thereto. The switches used during scanning for the presence of an electrical load may be combined or may be separate from polarity and voltage switches of the switching arrangement 82. Further, advanced semiconductors may be used instead of simple mechanical or relay type switches which are indicated in FIG. 6 for the sake of simplicity.

As noted above, the voltage and polarity of the power that is supplied to contacts C1 and C2 are automatically adjusted by sensing unit 66 to match the requirements of load 78. Thus, when two contacts of the load 78 are connected to contacts of the power supply arrangement 60, the sensing unit 66 detects the unique identifier (ID) (represented as identification load 80) of the load 78 through the sensing lines 72 and 74 and uses this ID to determine the voltage, current and polarity requirements of the load 78. If the voltage and the current requirements are in the range supported by the power supply, the sensing unit 66 sends a signal to the switch arrangement 82 to power a source in the right polarity and also sends a signal to voltage regulator 62 to set the required voltage. The sensing is done by applying a minimal, non-destructive sensing voltage or pattern, and observing responses of the identification load or element 80. The ID element 80 may be a simple resistor, that is read with a very low voltage below the activation of the normally non-linear response of the electrical or device load 78. In some cases, the ID element 80 may be a diode, or a resistor and a diode combination, or any passive or active circuit, including conductors and capacitors etc. that can be used to convey the presence and parameters associated with load 78. In some cases, RFID (radio frequency Identity) devices (not shown) may be used for probing without electricity.

In yet other cases, a digital ID may be used, and read, with a voltage that is below the active region of the load, or in some cases the adaptor unit may have intelligence to disconnect the load 78 until it establishes a connection or gets power from the base unit. This may be useful, for example, for resistive loads.

When the load 78 is disconnected from the contacts C1 and C2, the sensing unit 66 detects that the device bearing the ID element 80 is not connected to the power supply and turns off the switching arrangement 82, thereby disconnecting the power from the contact C1 and C2. In some cases, the base unit may disconnect based on a sensing of a mobile device current usage passage.

Figure 7:
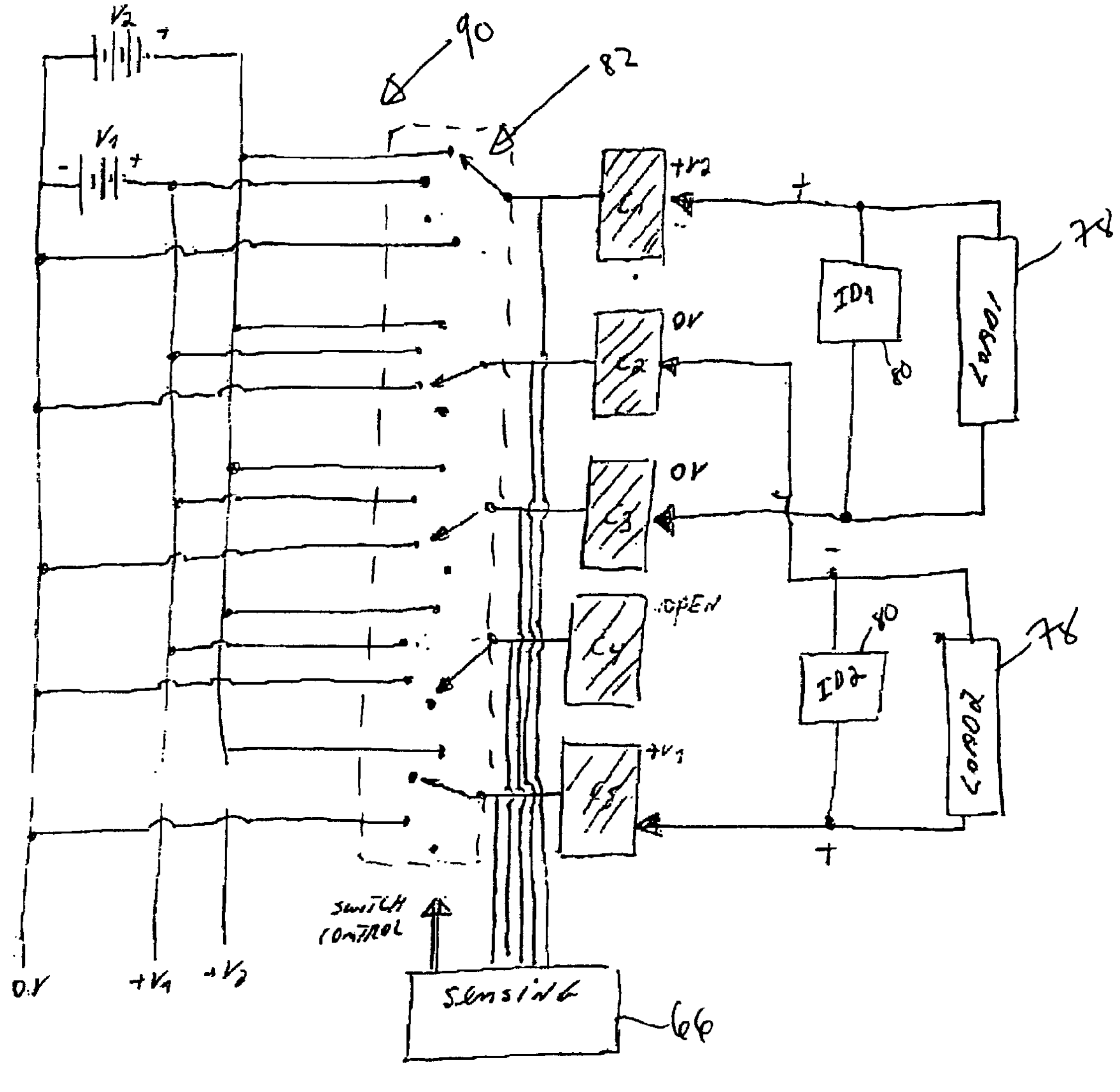
FIG. 7 shows a block diagram of a power provisioning system having multiple contacts in accordance with the invention.

FIG. 7 shows a block diagram of a power provisioning system 90 having multiple contacts C1, C2, C3, C4 and C5. The contacts C1-C5 are used to provide power to electrical loads 78 which are denoted as Load 1 and Load 2 in FIG. 7. ID elements 80, denoted as ID 1 and ID 2 respectively, provide identification information associated with Load 1, and Load 2 respectively, as described above. Sensing unit 66 controls a switching arrangement 82 to provide power at two predefined voltage levels (V1 and V2) to the loads 78, while automatically adapting the power polarity for each load 78. It will be appreciated by one skilled in the art, that rather than having fixed voltage rails, for example, two programmable rails may be used, and the parameters reported from sensing of the ID elements 80 may be used to select the required voltages. When the sensing unit 66 detects that identification element ID 1 is connected between power contacts C1 (+) and C3 (−), the sensing unit 66 activates the switches of contacts C1 and C2 to connect C1 to the (+) side of power source V1 and connects C2 of the (−) side of the power source V1. In a similar way, the Load 2 is connected to V2 in the correct polarity through C2 and C6. The sensing unit 66 may typically comprise a microcontroller and adaptation circuitry, including resistors, diodes, capacitors and possibly active components as well. Naturally, there will be a power supply to the sensing unit 66 itself, which has not been shown in FIG. 7, so as not to obscure aspects of the present invention. As mentioned above, control switches may be solid state or relays. In some cases, the ID elements may not only be used to provide identification information, but may actually control power flow to a device (not shown) to which it is connected by means of a switch (not shown). In these cases, the ID elements may include verification of voltage and current type (AC, DC etc.) and other auxiliary functions. In yet other cases, the adaptor unit may receive commands from the base unit (e.g. turn power on, set ID unique to the pad, etc.) Further, the adaptor unit may be integrated with the power management of the device to which it is connected (e.g. for retrieving information about battery state, CPU usage, etc.).

The above described power provisioning system may be combined with other elements to form a complete system that allows a user more freedom when using a notebook computer, for example, at a desk or similar environment, such as a home office, a hotel, an office, or even at a kiosk at an airport or other public place.

Figure 8:
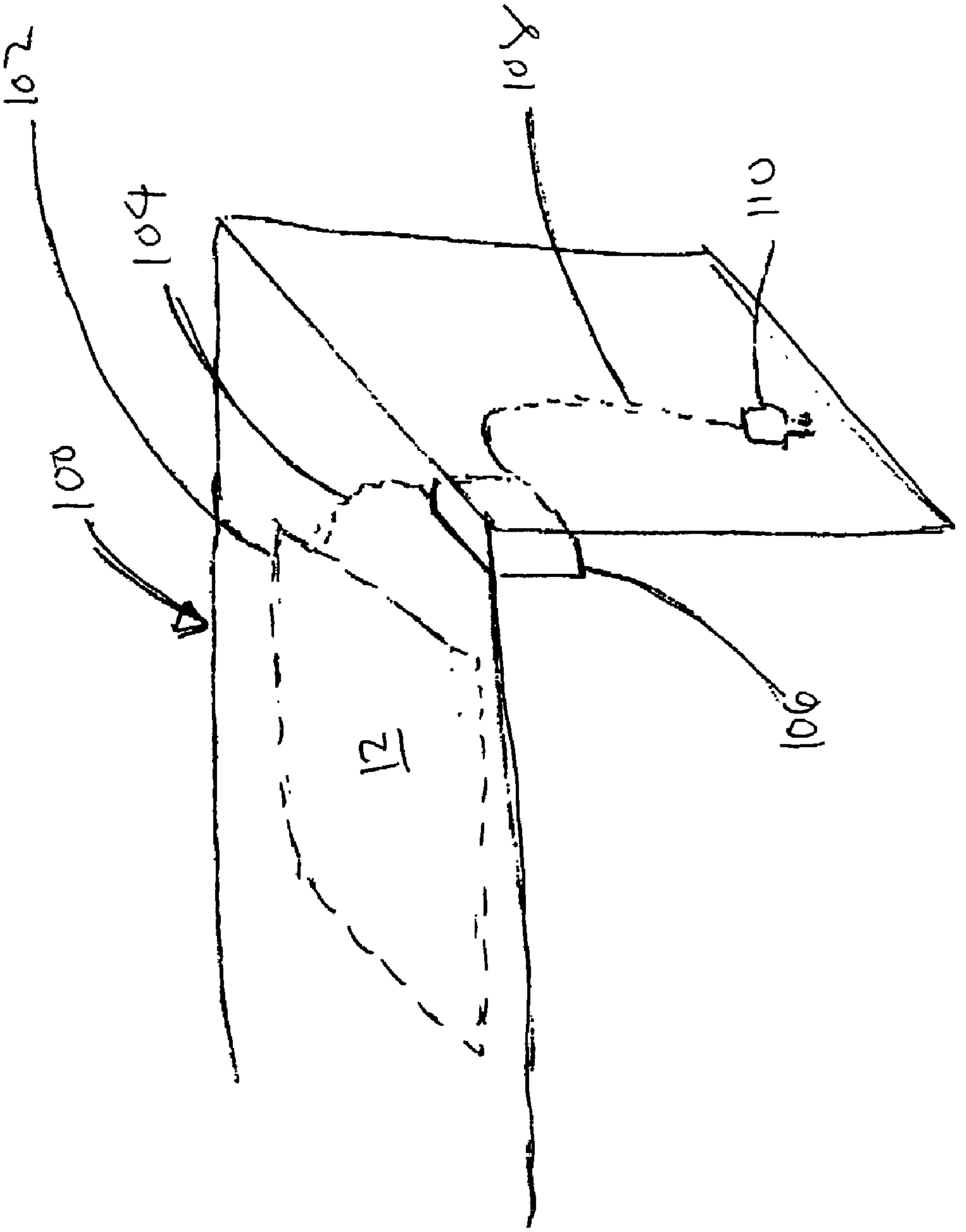
FIG. 8 shows a block diagram of a desk and a mat in accordance with the invention.

FIG. 8 of the drawings shows a desk 100 on which is placed a desk mat 102. The desk mat 102 includes a conductive area 12 with electrical contacts as described above. The desk mat 102 may be integrated into the desk 100.

In one case, the desk mat 102 includes a conductive plastic that may be applied in a thin layer on top of a metallic conductor interleaved with non-conductive material and surrounded by conductive plastic and metal. In other cases, color metallic areas may be silk screened onto mat 102, leaving sufficient openings for contacts. In yet other cases, acidic etchings into a metal substrate may create openings to deposit colored resins, in a process similar to the anodizing of aluminum. In yet other cases, chrome-plated or nickel-finished round metal contacts may be embedded in a rubber mat. All of the above approaches can be used to make a desk mat product that is visually appealing to consumers, and functions as a base for a charging or power unit as described above.

As can be seen in FIG. 8, a cabling system 104 which is hidden within the desk 100 connects to a power supply 106 that contains both the power source itself and the sensing and switching arrangement described above. A power cord 108 ending in a power connector 110 plugs into a regular household AC outlet, of the type available in homes and offices.

Figure 9:
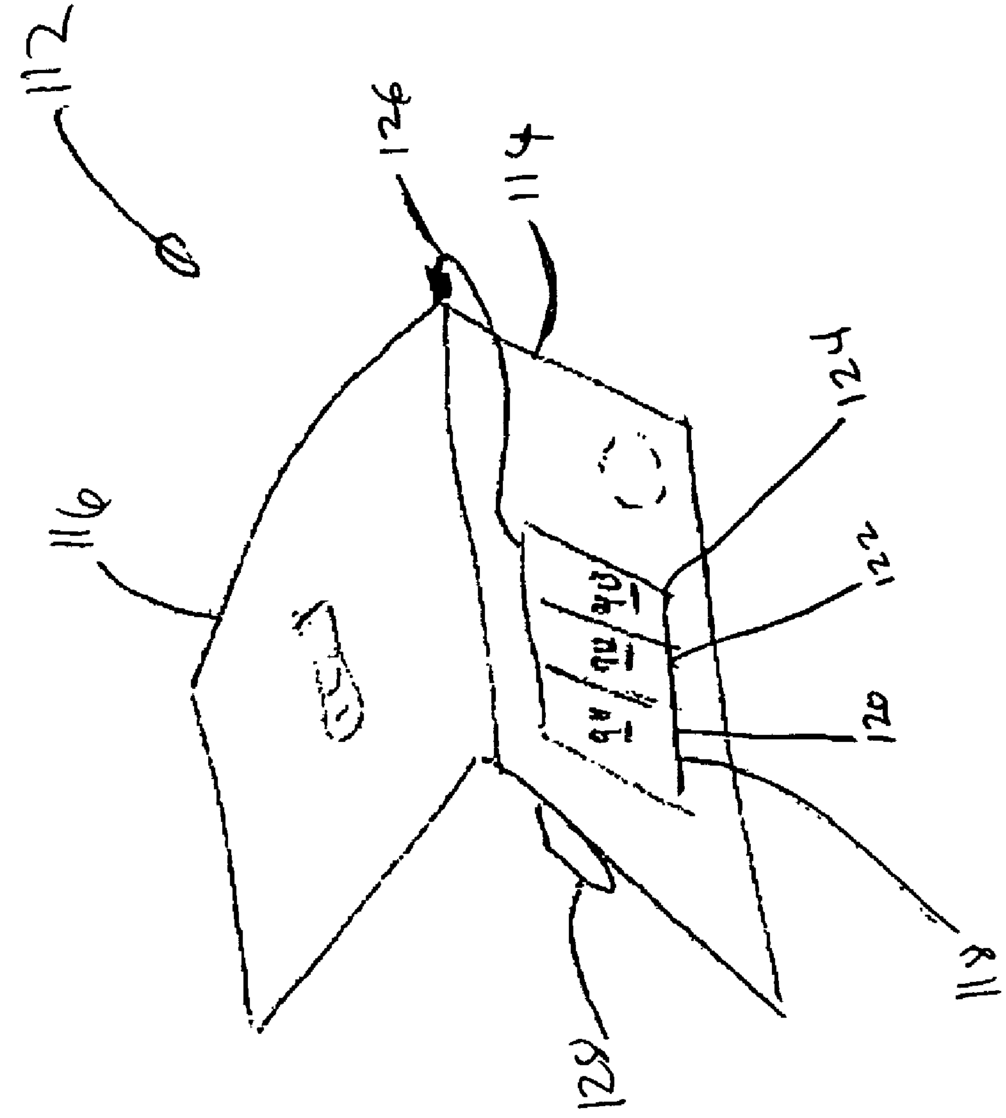
FIG. 9 shows a schematic drawing of an adaptor unit releasably secured to a notebook computer.

FIG. 9 shows one case in which an adaptor unit or piece 118 is releasably secured to a notebook computer 112. The notebook computer 112 is shown from a lower rear-end and includes a base section 114 and a lid section 116. As can be seen in FIG. 9 of the drawings, the notebook computer 112 is slightly opened with the lid section 116 spaced from and hingedly connected to the base section 114. The adaptor piece 118 is attached to an underside of the base section 114 using, for example, hook-and-pile fasteners, mounting tape, or any other suitable fastening arrangement including but not limited to screws, bolts, glue, cement, snaps etc. The adaptor unit 118 has, in this example, three separate areas 120, 122 and 124 as can be seen. The areas 120 and 124 may be conductive surfaces and the area 122 may be an insulator. A cable 126 is used to connect the adaptor unit 118 to the notebook computer 112 via a regular power supply port of the notebook computer 112.

Also shown in FIG. 9, a wireless network card 128 protrudes from a port of the notebook computer 112.

In some cases, the adaptor unit 118 may be integrally formed with the notebook computer, or in other cases, it may more specifically integrated with a battery unit or an enclosure for a battery unit, hence requiring a special cable or attachment.

Also, in a case in which the cable 126 is included, a convenient recepticle may be offered, so that the user does not have to unplug the adaptor unit in case of using a regular charger with a base. In other cases, the adaptor unit may be electrically disconnected, so as to avoid hazards by exposing live contacts.

Figure 10:
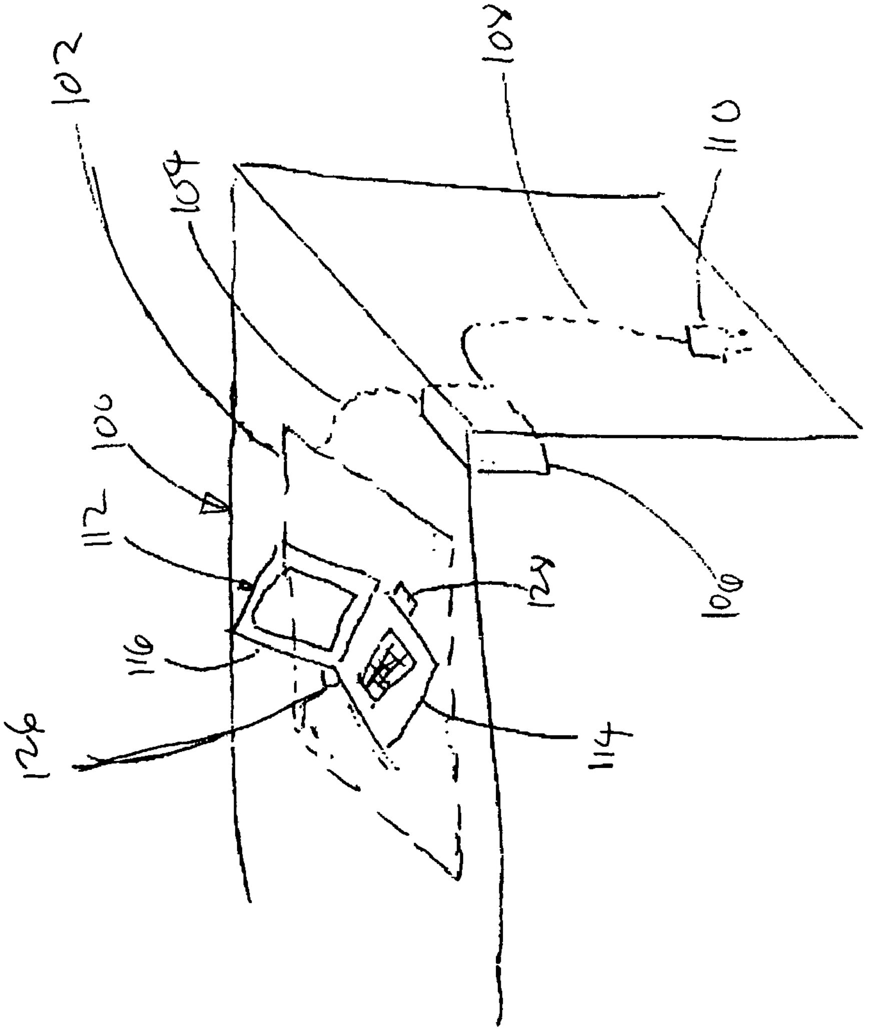
FIG. 10 shows a schematic drawing of a notebook computer placed on a mat in accordance with the invention.

FIG. 10 shows a schematic drawing in which the notebook computer 112 is placed on a conductive mat 102 of a desk 100. Each of the components 100, 102 and 112 have been described with reference to FIGS. 8 and 9 respectively.

As can be seen in FIG. 10, notebook computer 112 is placed at an odd angle, to exemplify that such a device may, according to the novel art of this disclosure, be placed in any position on conductive mat 102, thus allowing for notebook computer 112 to be charged or powered while the notebook is in use, without having to plug in any cable or carry any power supplies.

It is to be appreciated that many variations are possible without departing from the spirit of the novel art of this disclosure. For example, contacts 120, 122 and 124 of the adaptor unit 118 may be round as opposed to being square and may have dimensions that match those of the notebook base section 114, rather than being scaled to a functional minimal size. In other cases, adaptor unit 118 may connect to a docking connector for notebook computer 112, as opposed to using a power cord arrangement. In one case, adaptor unit 118 may be integrated into the standard enclosure of a notebook, thus eliminating a need for a separate, add on device.

Desk mat 102 may also have many variations. In one case desk mat 102 may be used in conjunction with a standard power supply provided by a notebook manufacturer and may contain by itself only the sensing and switching functionality, rather than the full power supply.

In yet other cases, the system may be used to transmit data over the established electrical connections, as opposed to just power. This may be achieved either by using additional contacts, or by modulating signals onto the existing power leads and adding a filter (i.e. inductor/capacitor) to separate DC supply from high speed data signals such as Ethernet signals etc. In such cases, an Ethernet port may be offered in both a desk mat 102 and a cable on adaptor unit 118. Other network standards besides Ethernet may also be supported, as desired or required. In some cases, wireless methods may be used for the data transmissions. These methods include but are not limited to optical methods including infrared (IR), inductive coupling, capacitive coupling, or radio frequency with or without modulation. Some cases may include virtual docking connections or regular local area network connections, or both.

Many variations may be realized by shifting the partitioning or integration of features among various elements of the system described herein. In some cases, for example, a mat 102, may be integrated into the desk 100. In other cases, the mat may be a foldable or rollable mat reduced in size for easy portability, for the convenience of travelers. In some cases, input devices may be integrated into the base charging unit, for example a tablet or a large touch pad, the pad surface may be mouse friendly (both to mechanical and optical mice) or it may be used to power semi-mobile devices such as desk lamps, electrical staplers, etc. Additionally, the desk mat 102 may be of an anti-static material (thus making it safer than using no mat at all). In some cases, extensions may be offered as modules, including making the mat area of the charging power device modular (cutting to order, tiles etc.). In some cases, the base unit provides a standard power and each device/adaptor converts it to the level needed by its respective device.

Also, in some cases some information and sensing is done in the reverse direction (i.e. base to device) and the device also makes some decisions on power switching (for example is this space safe to use In some cases, the contact surface may be made like a fabric (printed or woven), and applied to walls in offices, schools, homes, stores etc. In yet other cases, the sensing or interrogation before releasing power may be used in existing building wiring, controlling outlets. Thus, only an authorized device can draw power. This may have important benefits such as improving safety (e.g. for children), or for security against power theft in public or semipublic places, or avoiding overload to a back-up network. In a hospital, for instance, non-essential units accidentally plugged in to an emergency power system would not work without an override. In some cases, the base unit may do power allocation and management, e.g. between multiple devices being powered at the same time. The functionality of the system can be divided in many ways between the pad surface and the device.

The system can also provide for an adapter/device to have more than two contacts and it can do smart power routing/conversion as well. In some implementations, the surface contacts or some of them can be energized or grounded all the time (e.g. the interleaving geometry). In yet other cases, the surface may have only one pair of contacts. In some cases 'handshaking', does not require bi-directional communication or communication at all. Some implementation can use for example simple analog sensing of resistance or diode. Also, in some cases, sensing may entail multiple steps, such as 1. check for diode 2. check resistor and 3. check ID digitally. Each of the steps may use different voltages, and in some cases only one, or two or three may be done. Further, tests may also include DC, AC and modulated probing signals.

Figure 11:
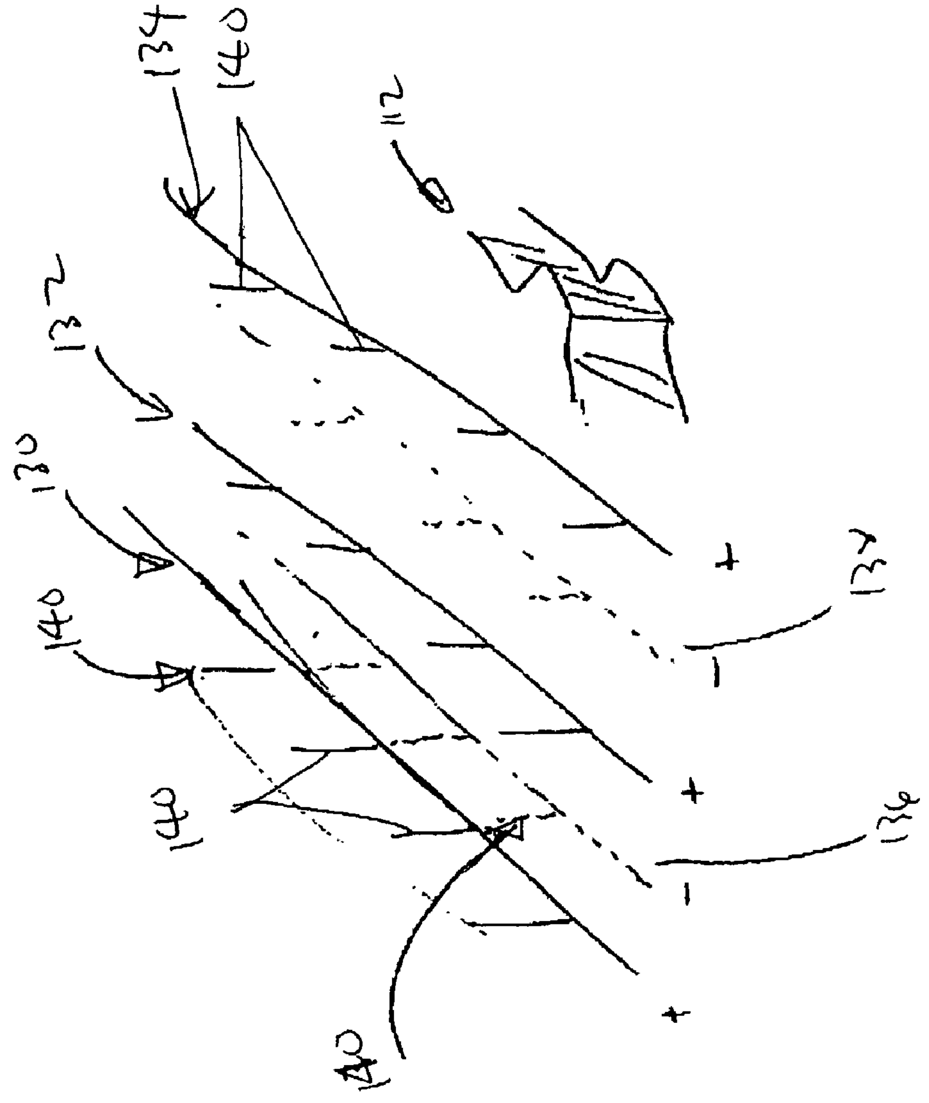
FIG. 11 shows a block diagram of a track system comprising interleaved positive and negative tracks in accordance with the invention.

FIG. 11 of the drawings shows a track system comprising interleaved positive and negative tracks. The positive tracks are indicated by reference numerals 130, 132 and 134, whereas the negative tracks are indicated by reference numerals 136 and 138. Each track includes a number of longitudinally spaced projections which stand proud of the track and which are indicated, generally by reference numeral 140. In some cases, the projections may take a form of nails, bolts, etc. which stand proud of the tracks themselves.

Figure 12:
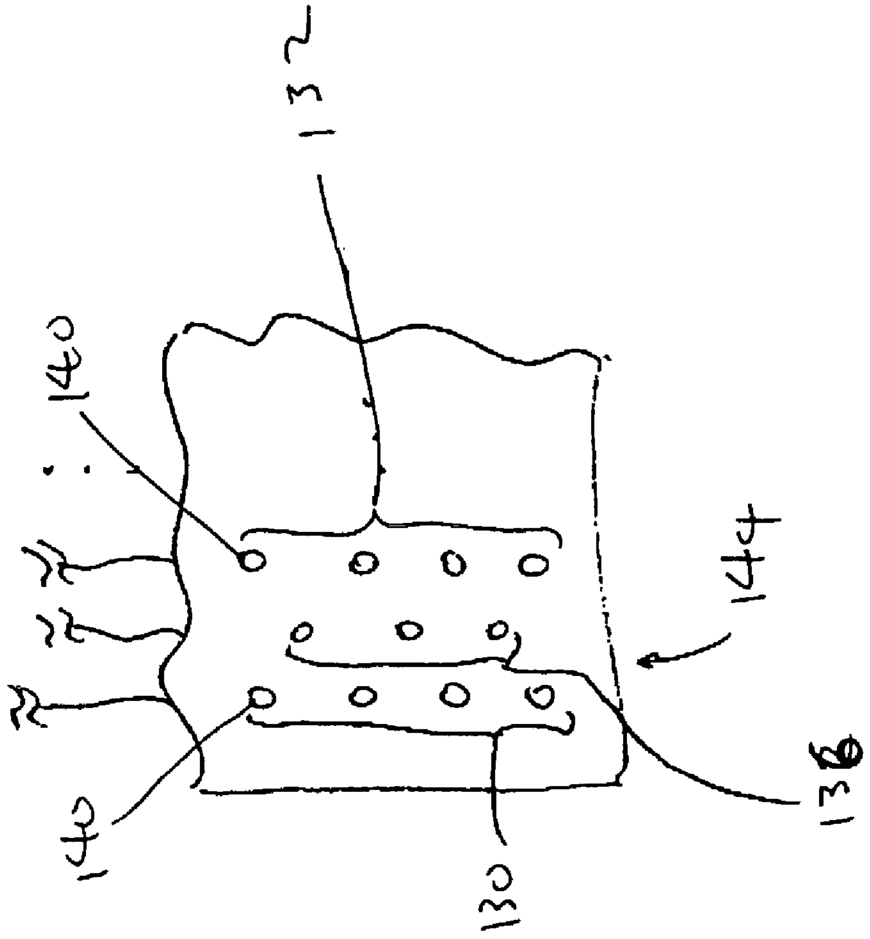
FIG. 12 shows a top plan view of a portion of FIG. 11.

FIG. 12 of the drawings shows a top plan view of a portion of FIG. 11 show only tracks 130, 132 and 136. The track system is integrated into a base pad 144.

The circular areas in FIG. 12 represent the rising conductors or projections 140 which are also known as feed points in (FPs) which extend into an out of the plane of the page in both directions, depending on a size that is required.

Figure 13:
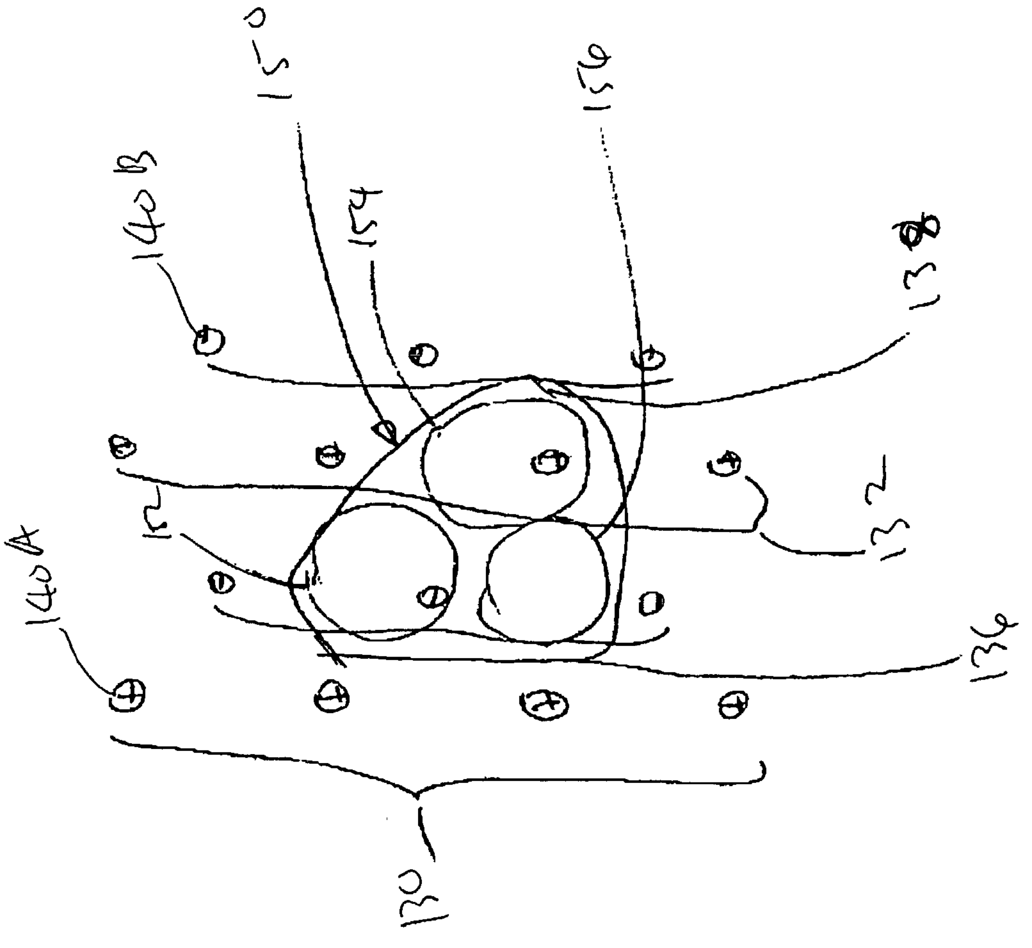
FIG. 13 shows a schematic drawing of a base pad which is in contact with an overlying adaptor pad in accordance with the invention.

FIG. 13 of the drawings shows the base pad 144 which is in contact with an overlying adaptor pad 150 (hereinafter adaptor pad) comprising three circular electrical contacts 152, 154 and 156. In FIG. 13 the positive FPs are denoted as 140A and the negative FPs as 140B. Each electrical contact 152, 154 and 156 is separated from each other and may be used to feed a selection logic that determines which contact 152-156 has been connected to a positive FP 140A and which contact has been connected to a negative FP 140B. In reality, a higher number of contacts such as four or more may be required to guarantee at least one contact to a positive FP 140A and one contact to a negative FP 140B, depending on both a geometry of the pad 144 and the adaptor pad 150, as well as a geometry of the contacts 152 to 156 and the FPs 140. For the sake of clarity, however, only three contacts 152 to 156 have been shown. In fact, using this geometrical arrangement, it may be mathematically proven that even four contacts do not always guarantee connection with a positive FP 140A and a negative FP140B. It is to be understood that the words positive and negative are to be seen in the broadest terms as simply representing conduits for power, since in some cases, rather than DC, AC may be used, or pluses, or power in conjunction with data etc.

The simplest way to achieve correct connectivity is to use a bridge rectifier to extract the voltage from the FPs 140 and then to use that voltage to drive circuitry (not shown) between adaptor pad 150 and a device (not shown), such as a notebook computer. The circuitry then, using low drop switches (i.e. bipolar solid state switches in parallel to the bridge rectifier), connects the actual contacts of the adaptor pad 150 to the conductors of the notebook charger connector (details not shown).

It will be appreciated by one skilled in the art that depending on the structure of the protrusions or FPs 140A, 140B, their sizes and spacing, the adaptor pad 150 and their contacts 152 to 156 must be such that they cannot short between positive and negative FPs, on the one hand, and that independently of the positioning on the surface, must always be connected to at least one positive and one negative FP.

In yet other situations, a complete rail may surface and depending on the dimensions and distances, the dimensions and distances as well as the geometry of the adaptor pad 150 may change. In some cases, a linear array be better, or a T-shaped, X-shaped, a honeycomb cluster of contacts, or other suitable multi-port connection may be used instead of a adaptor pad 150 having a contact geometry as soon in FIG. 13. In some cases, a diamond shaped adaptor pad 150, using four rather than just three contacts in conjunctions with an interleaving field of cylindrical FPs 140 as shown in FIG. 13, may be used.

Depending on the sizes and geometry, the FPs 140 may in some cases be formed into diamond shapes, covering almost all of the surface of the pad 144, with very tiny gaps for insulation, or may be formed in a honeycomb pattern. In other cases, the FPs 140 may resemble round dots, as shown in FIG. 13 and may be arranged in the geometry shown in FIG. 13, or any other suitable geometry. In some cases, the FPs 140 may comprise spherical or cylindrical projections with or without mitering, or pokes, etc. As noted above, more than three or four electrical contacts may be required to guarantee contact to a pair of FPs 140 of with opposite plurality.

Suitable geometries for the FPs 140 may be obtained by modeling their connectivity using a mathematical model and a computer. In some cases, the design of the FPs 140 on pad 144 may be driven by industrial design concepts.

In some cases, it is preferable to arrange the adaptor pad 150 across the whole surface area of the mobile device, rather than across only a localized portion, thus allowing the weight of the mobile device to be distributed across all contacts 152 to 156, ensuring a better electrical contact, as opposed to having all contacts of the adaptor pad 150 in one corner, which might result in some of them lifting off (unless they are spring loaded or the pad is pivotally mounted). In some cases, the contacts 152 to 156 may be integrated into an enclosure of the mobile device itself, with internal connections.

In some cases, power may always be on the FPs 140 thus not requiring any sensing to be performed. In other cases, only basic short circuit protection may be provided.

Figure 14:
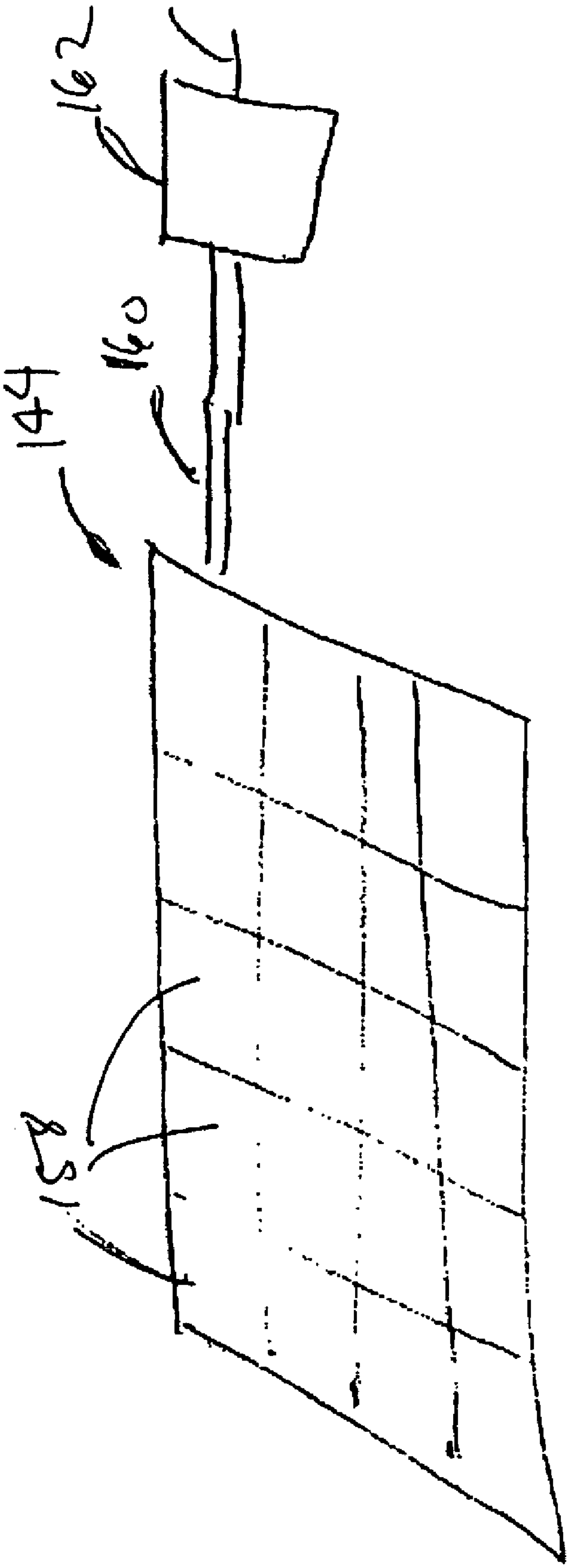
FIG. 14 shows another case of a base pad in accordance with the invention.

FIG. 14 shows another example of a pad 144 whose microstructure has been sectioned into rectangular elements 158. In one case, the positive FPs 140A of each section of 158 could be connected separately through a cable 160 to an adaptive power supply 162 and the negative FPs 140B throughout the whole pad could stay connected to the power supply 162 so that it is always on. In one example, once a mobile device is placed on the pad 144, only that section containing the mobile device may be activated. Thus, different sections of the pad 144 could have different voltages, allowing the mobile device not to require a regulator or an adaptor unit. Thus, a user, for example, may place a mobile phone and notebook computer, an a PDA all onto surface 144, and the adaptive power supply would, after identifying each device, turn on either a standard voltage or a voltage specific to each device, depending on whether the devices have voltage adaptors themselves or only have identification switching devices.

Figure 15:
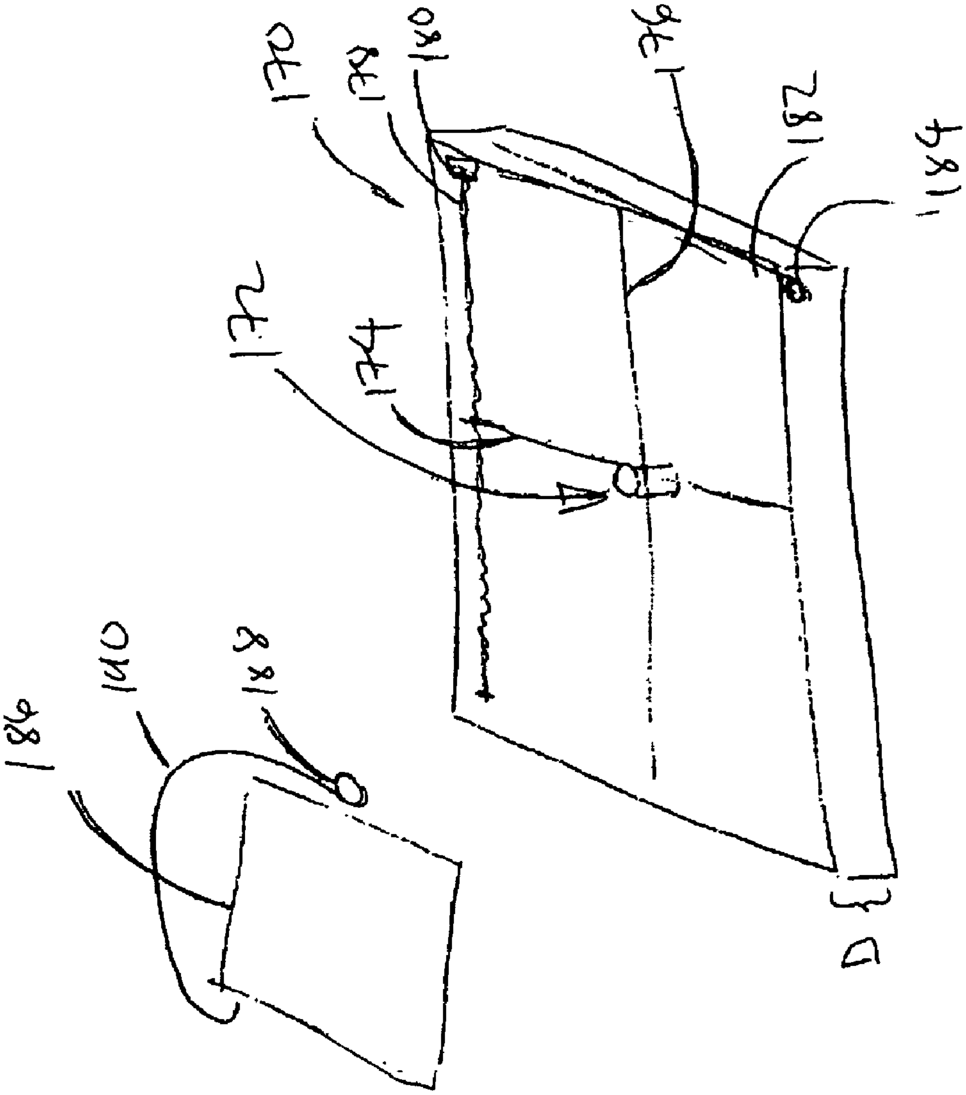
FIG. 15 shows yet a further example of a base pad in accordance with the invention.

FIG. 15 of the drawings shows a pad 170 of either conductive or non-conductive material, having a thickness D. Inside the pad 170 is an inductor indicated generally by reference numeral 172 which is connected to longitudinal and transverse arms 174 and 176 respectively. A drive mechanism comprising a screw fitted shank 178 and a motor 180 can be operated to displace arm 174 in a direction parallel to transverse arm 176. Similarly, the arm 176 is connected to a drive mechanism comprising a screw fitted shank 182 to a motor 184 which can be operated to displace the inductor 172 in a direction parallel to the arm 174. While the example shown in FIG. 15 of the drawings depicts a drive mechanism comprising screw fitted shanks 178 and 182 coupled to electrical motors 180 and 184 respectively, it will be appreciated by one skilled in the art that other drive mechanisms are possible such as belt drives, scissor arms, etc.

A notebook computer 186 includes a matching inductor 188 that may contain some circuitry. A cable 190 couples the inductor 188 to standard charging circuitry of the notebook computer 186. In some cases, the inductor 188 may be integrated into the notebook 186.

When the notebook computer 186 is placed on the pad 170, the motors 180 and 184 (shown only in block form for the sake of simplicity) are activated, for example by a command such as pushing a button or by detection means such as weight detection or other detection means to detect the position of the notebook 186 on the pad 170 based on a location of the inductor 188. A controller, may be embedded in the pad 170, or may be part of a power supply (also not shown) for the pad 170 and is used to send data to a small controller/receiver unit (not shown). In other cases, the controller may be controlled by the notebook 186. By scanning a surface of the pad 170, the controller aided by motors 180 and 184 can detect an area (called a sweet spot port) where optimal or near-optimal coupling between the inductor 172 and inductor 188 may be achieved, which then provides an indication of the relative position of inductor 188 and hence notebook computer 186 on the pad 170.

In some cases, the inductor 188 may send out a homing signal that may be used to track a location of the notebook computer 186 on the pad 170. In other cases, inductor 172 may send out a ping signal and listen for a resulting echo response from inductor 188. In yet other cases, as described below, other sensor type or optical detection can also be used to assist in searching the position of inductor 188 relative to the pad 170.

Once the sweet spot area for inductor 188 has been found, small step wise increments allow for more accurate positioning of the inductor 188 relative to the inductor 172, thus allowing power to be increased once optimal magnetic coupling between inductors 172 and 188 is achieved. If a user were to move notebook computer 186, then the magnetic coupling quality would fall, which could be observed by the adaptive power supply resulting in shutting off power and initiating a new search sequence to align inductors 188 and 172 for the purposes of charging notebook computer 186.

Figure 16:
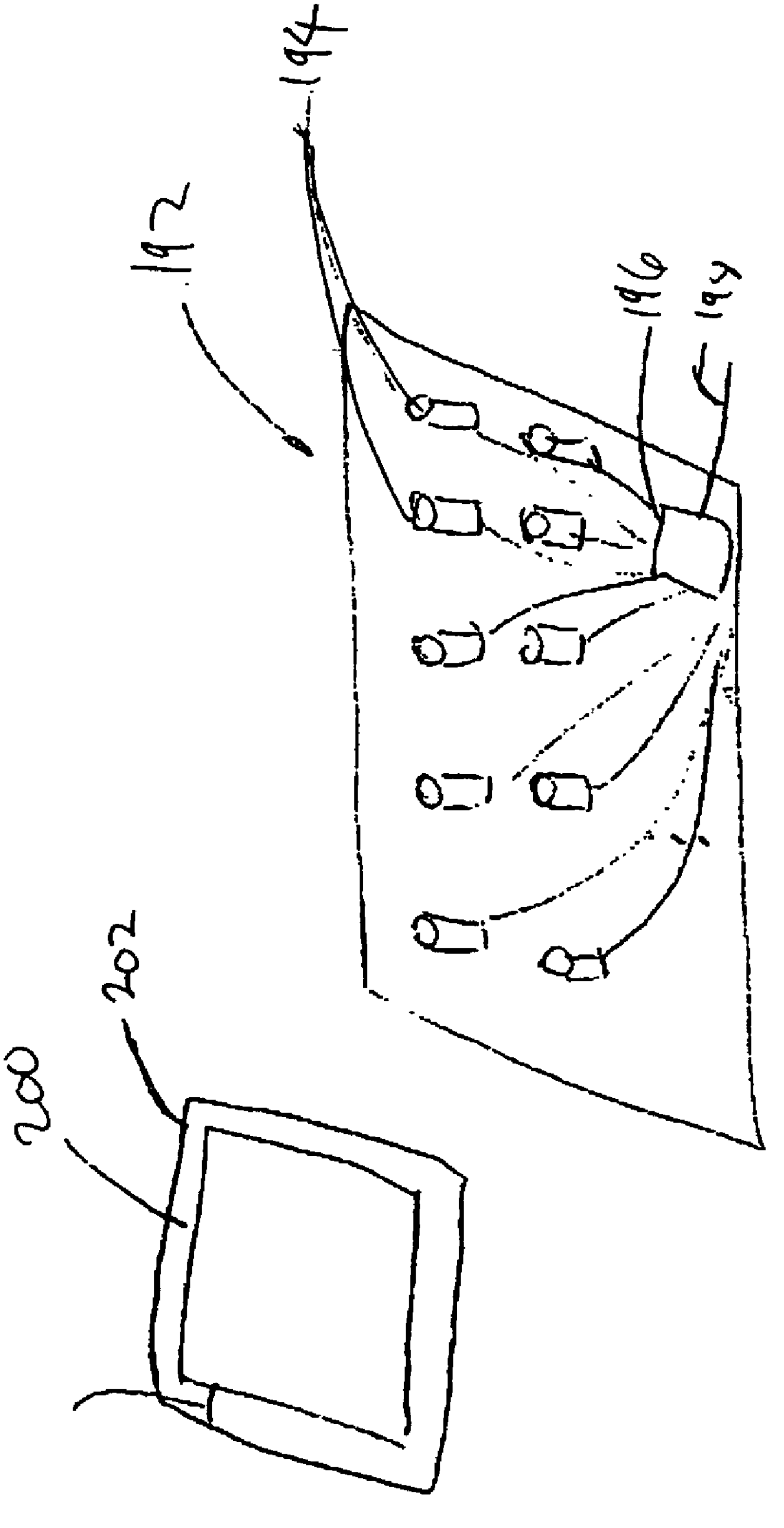
FIG. 16 shows a block diagram of a notebook computer which is inductively coupled to a charging pad in accordance with invention.

Referring now to FIG. 16 of the drawings, another configuration can be seen whereby a notebook computer 200 is inductively coupled to a charging pad 192 for the purposes of charging the notebook computer 200. The charging pad 192 includes a plurality of inductors 194 which are distributed through a substrate of the charging pad 192 which may be conductive or non-conductive. Each of the conductors 194 is connected to a controller 196 which, in turn is connected to a power supply (not shown) via an electrical lead line 198.

Referring to the notebook computer 200, it will be seen that the notebook computer 200 includes an inductor in a form of a receiver coil 202 which is dimensioned such that when the notebook computer 200 is placed on a surface of the charging pad 192, the inductor 202 encloses several inductors 194 of the charging pad 192. In some cases, the inductors 194 may be provided with electronic switching whereby power to the inductors 194 is switched on by controller 196. However, in other embodiments, no electronic switching of the inductors 194 is provided. Depending on the geometry and configuration of the inductors 194 and the inductor coil 202 power can then be selectively turned on to one or more of the inductors 194, thereby to improve coupling between the inductor coil 202 and the inductors 194 which then function as an emitting coil.

Figure 17C:
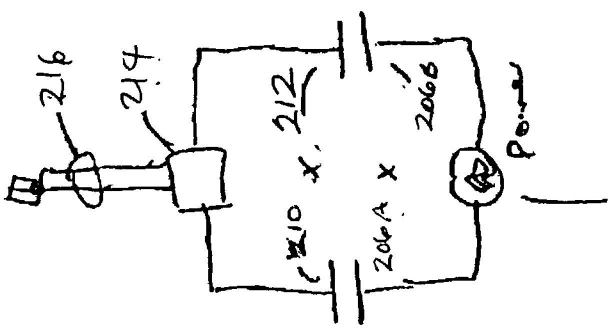
FIGS. 17A to 17C shows one case of a coupling system in accordance with the invention.
Figure 17A:
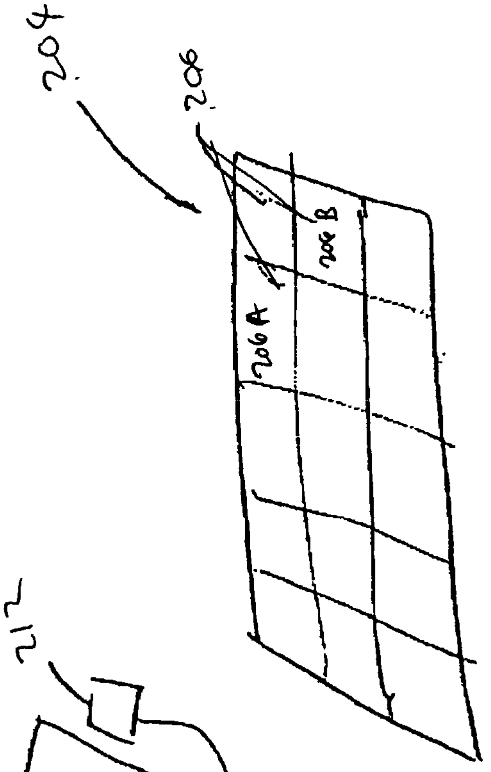
Figure 17B:
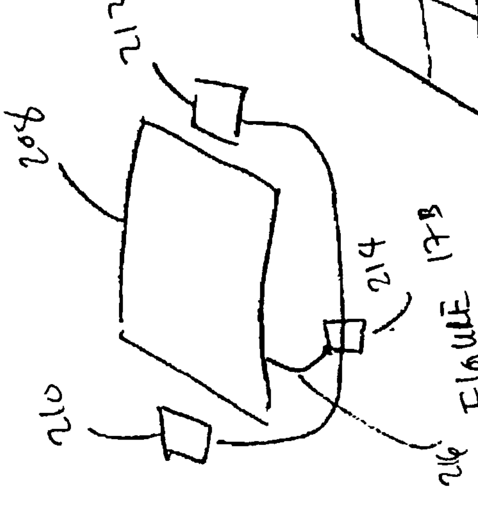

FIGS. 17A to 17C of the drawings shows yet another approach for a coupling system. Referring to FIG. 17, a pad 204, which either may be conductive or non-conductive, although non-conductive is preferred, is divided into an array of electrodes 206. A notebook computer indicated generally by reference numeral 208 (see FIG. 17B) has two electrodes 210 and 212, which are connected to a power receiving unit 214 which in turn is connected via a cable 216 to a power adaptor plug of the notebook computer 208. FIG. 17C shows that, based on a determination of a position of notebook computer 208 on charging pad 204, electrodes 206A and 206B are selected from available electrodes 204 to form a capacitive transformer with notebook electrodes 210 and 212. Power is fed into power receiving unit 214 and hence to notebook computer 208 via the cable 216.

In some cases, the charging pad 204 may be a combination wherein one "wire" is conductive (e.g. ground) and the other is capacitive.

Figure 18:
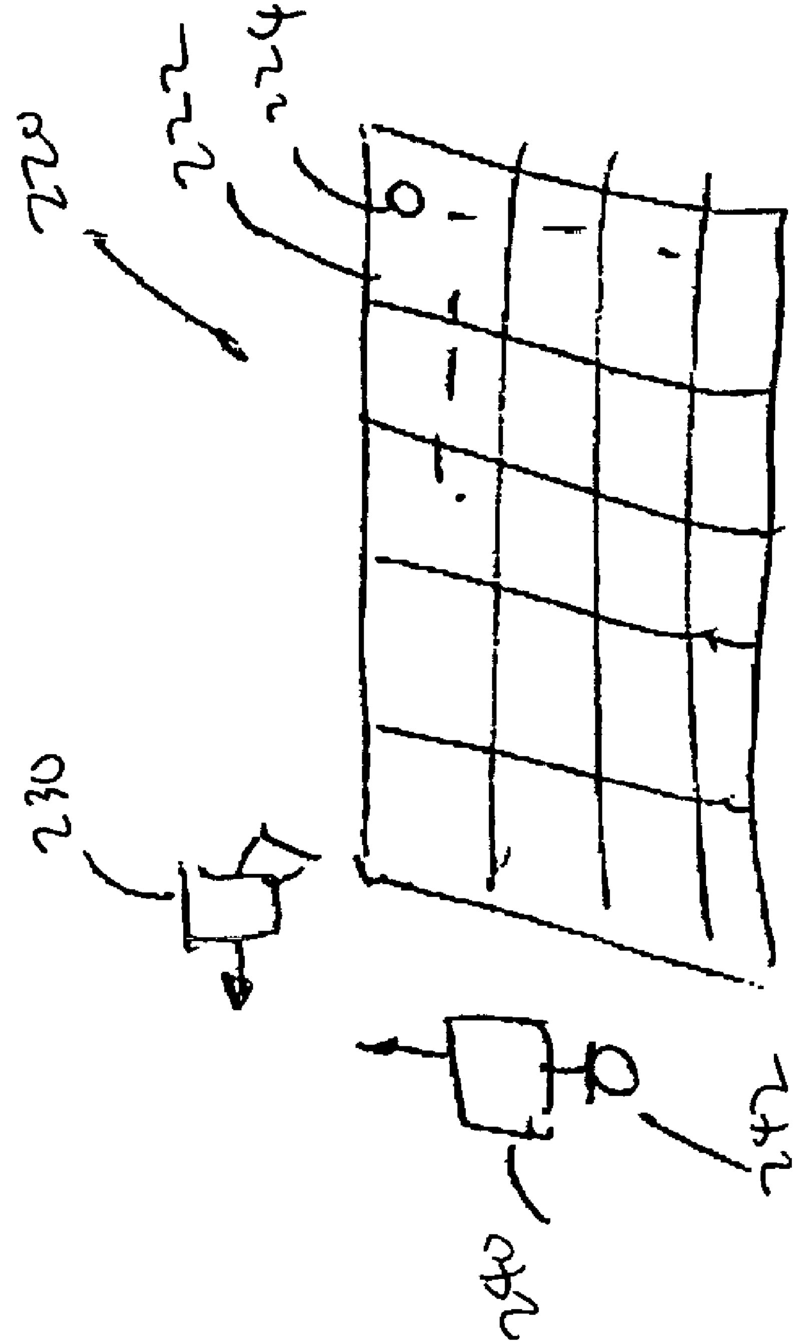
FIG. 18 schematically illustrates a few alternative methods for activation and determination of a position of a notebook computer on a charging pad in accordance with the invention.

Referring to FIG. 18 of the drawings a few alternative methods for activation and determination of a position of a notebook computer on a charging pad is shown. For example, a pad 220, which may be conductive or non-conductive is partitioned into rectangular sections 222, each of which contains a sensor element 224. In some cases, the sensor element 224 may be a photosensor. In other cases, the sensor elements 224 may simply comprises mechanical pressure switches, or piezo-electric pressure or weight sensors, etc.

According to data obtained by sensors 224, a position of a mobile device on the charging pad 220 may be determined using information such as a weight and footprint of the mobile device. In some cases even a device ID for the mobile device may be used.

In other cases, the piezo-electric sensors may pick up ultrasonic signals emitted by a notebook computer or, in other cases the sensors may ping the notebook computer, which will then respond with an echo giving information about its position and its type.

Alternatively, a camera indicated generally by reference 230 may be used to take a picture of the pad 220 and to monitor ("see") a device's position on the pad 220. For example, image recognition means associated with the camera 230 may recognize a model and type of a mobile device, as well as its orientation and may then instruct an adaptive power supply or one of the non-conductive systems described above, to activate the power accordingly.

In yet another case, a voice recognition system indicated generally by reference numeral 240, may include a microphone 242 connected to it. In this case, a user may simply say, for example "please charge my Sony™ notebook computer" and accordingly, the voice recognition system 240 would instruct the adaptor power supply or a non-conductive charging pad to turn on power.

In yet other cases, radio frequency link with a network, such as an 802.11×type network or a GPS network or any other network, may be used to locate (triangulate) the position of a mobile device and determine whether it is situated on a pad and thereafter to activate the pad (not shown) accordingly. In other cases, a button may be provided on a charging pad itself or on a mobile device to be charged that when activated, for example by pushing, initiates charging, rather than automatic initiation of charging. Such a manual initiation of charging would avoid unintentional charging cycles.

In yet other cases, a pad deploying a conductive surface with opening may be placed above another solid conducting surface, separated by an insulating layer with slightly smaller openings (not shown). Ball-like contacts may be spring loaded and may protrude from an undersurface of a mobile device, such that some of these balls will "land" in the holes and connect to a lower plane carrying one polarity, the others resting on an upper plane, connected to a top layer carrying another polarity. Thus, the situation is created wherein power can be sent up to the mobile device, without having to plug in any connection, while still maintaining freedom to move the device.

In yet other cases, current may be redirected to proper contacts by sensing a pressure exerted by the mobile device on a base unit. Once a mobile is placed on top a surface of the base unit, pressure on the surface determines a location of the mobile device and routes power to the appropriate location.

In yet other cases, current may be redirected to proper contacts by using optical senses. Certain senses embedded in a base unit will detect an optical signal, such as an infrared signal generated by an adaptor unit. Based on a formula dependent on the optical signal, the base unit may then redirect power to the proper contacts. In some cases, the optical signal may be generated at or away from the base unit and thereafter receive the adaptor unit.

In other cases, the adaptor unit may be connected, attached, or integrated into a side of a mobile device. In the case of the adaptor unit being integrated to a side of the mobile device, the adaptor unit would include contacts that connect to corresponding contacts to a base unit. In yet other cases, the adaptor unit may be attached to a prop of the mobile device or to a screen of the mobile device. In such cases, when the lap top screen is fully open power would then be transferred to contacts on a base unit to the adaptor unit on the mobile device.

Although the present invention has been described with reference to specific exemplary embodiments, it will be evident that various modifications and changes can be made to these embodiments without departing from the broader spirit of the invention as set forth in the claims. Accordingly, the specification and the drawings are to be regarded in an illustrative sense rather than in a restrictive sense.

What is claimed is:

1. A power delivery system comprising:

a contactor device including a contactor body defining a contact surface shaped and dimensioned to make physical contact with an adaptor surface of an adaptor device;

a plurality of first electrical contacts of a first and second polarity on the contactor body at or adjacent the contactor surface, wherein electrical contacts of the first polarity are interspersed with electrical contacts of the second polarity, and an electrical contact of the first polarity is to be dynamically paired with an electrical contact of the second polarity to close an electrical circuit between the contactor device and an adaptor device having second electrical contacts when the adaptor device is brought into physical contact with the contactor surface, wherein the adaptor device includes an identification mechanism to provide compatible voltage and polarity settings to the power delivery system, wherein the identification mechanism further comprises a memory storage comprising handshaking information including information selected from the group comprising identification information for the adaptor device, settings for the power delivery system to energize the adaptor device, and authentication information required to connect the adaptive device to a computer network.

2. The power delivery system of claim 1, further comprising the adaptor device, wherein the adaptor device is to have at least five second electrical contacts.

3. The power delivery system of claim 1, wherein the adaptor device is integrated with a mobile device.

4. The power delivery system of claim 3, wherein the adaptor device comprises selection logic to determine which of a plurality of second electrical contacts is to be electrically connected to the dynamically paired first electrical contact.

5. The power delivery system of claim 1, wherein the contactor device includes parallel spaced apart line conductors embedded in the contactor body, and wherein the first electrical contacts each have a first end connected to the line conductors and a second end that stands proud of the contactor surface.

6. The power delivery system of claim 1, further comprising a sensing unit to sense parameters of an electrical load connected to the dynamically paired first electrical contacts, and a control mechanism to cause a power supply to selectively energize the dynamically paired first electrical contacts based on the parameters.

7. The power delivery system of claim 6, wherein the parameters comprise hand shaking information selected from the group consisting of information identifying the mobile device, information on settings for the power supply to energize the mobile device, and authentication information required to connect the mobile device to a computer network.

8. The power delivery system of claim 7, wherein selectively energizing the paired first electrical contacts comprises not energizing the paired electrical contacts when the authentication information does not match corresponding authentication information stored within the power delivery system.

9. The power delivery system of claim 1 wherein the identification mechanism comprises an identification element that can be sensed by a sensing circuit of the power delivery system to determine the compatible voltage and polarity settings.

10. The power deliver system of claim 1, further comprising a modulation mechanism to modulate the handshaking information onto electrical contacts connecting the adaptor device to the power delivery system.

11. A system comprising:

a contactor member comprising a generally flat contactor body having at least one interconnection element to connect a mobile device to a power supply;

an image capture mechanism to capture an image of the mobile device positioned on the contacror member;

an image recognition mechanism to recognize the image of the mobile device; and a control mechanism to selectively energize the at least one interconnection element based on stored parameters associated with the recognized mobile device and a position of the mobile device on the contactor member, wherein the position of the mobile device on the contactor member is determined based on the image captured by the image capture device and recognized by the image recognition mechanism.

12. The system of claim 11, wherein the at least one interconnection element comprises an electrical contact element.

13. The system of claim 11, wherein the at least one interconnection element comprises an inductor element.

14. The system of claim 13, further comprising a positioning mechanism to position the inductor member in alignment with a corresponding inductor member of the mobile device.

15. The system of claim 11, wherein the stored parameters include information selected from the group consisting of the information identifying the mobile device, settings for a power supply required to energize the mobile device, and authentication information required to connect the mobile device to a computer network.

* * * * *